(12) United States Patent
Sandhu et al.

(10) Patent No.: US 11,188,682 B2
(45) Date of Patent: Nov. 30, 2021

(54) APPARATUS AND METHOD FOR MASKING POWER CONSUMPTION OF A PROCESSOR

(71) Applicant: ARM Limited, Cambridge (GB)

(72) Inventors: Bal S. Sandhu, Fremont, CA (US); George McNeil Lattimore, Austin, TX (US); Carl Wayne Vineyard, Ceder Park, TX (US)

(73) Assignee: Arm Limited, Cambridge (GB)

( * ) Notice: Subject to any disclaimer, the term of this patent is extended or adjusted under 35 U.S.C. 154(b) by 92 days.

(21) Appl. No.: 16/378,256

(22) Filed: Apr. 8, 2019

(65) Prior Publication Data

US 2019/0236315 A1   Aug. 1, 2019

Related U.S. Application Data

(63) Continuation-in-part of application No. 15/185,789, filed on Jun. 17, 2016, now Pat. No. 10,255,462.

(51) Int. Cl.
*H04L 29/06* (2006.01)
*G06F 21/75* (2013.01)
*G06F 1/28* (2006.01)

(52) U.S. Cl.
CPC .............. *G06F 21/755* (2017.08); *G06F 1/28* (2013.01)

(58) Field of Classification Search
CPC ................................. G06F 21/755; G06F 1/28
See application file for complete search history.

(56) References Cited

U.S. PATENT DOCUMENTS

| 5,532,578 | A | * | 7/1996 | Lee | ........................ | G11C 5/147 |
| | | | | | | 323/313 |
| 6,107,835 | A | * | 8/2000 | Blomgren | ............... | G06F 30/30 |
| | | | | | | 326/98 |

(Continued)

FOREIGN PATENT DOCUMENTS

CN   111371422 A * 7/2020

OTHER PUBLICATIONS

Tena-Sanchez, Erica, Javier Castro, and Antonio J. Acosta. "A methodology for optimized design of secure differential logic gates for DPA resistant circuits." IEEE Journal on Emerging and Selected Topics in Circuits and Systems 4.2 (2014): 203-215. (Year: 2014).*

(Continued)

*Primary Examiner* — Shawnchoy Rahman
(74) *Attorney, Agent, or Firm* — Pramudji Law Group PLLC; Ari Pramudji

(57) ABSTRACT

An apparatus for masking power consumption associated with one or more operations of a logic circuitry of a processor. The apparatus comprises power-complementing circuitry configured to provide a second power consumption to directly power-complementing the power consumption associated with the one or more operations of the logic circuitry. The second power consumption complements the power consumption associated with the one or more operations of the logic circuitry. The apparatus further comprises header circuitry configured to enable a common node to vary in voltage corresponding to the one or more operations of the logic circuitry. The power-complementing circuitry and the header circuitry are each coupled to the logic circuitry at the common node.

15 Claims, 14 Drawing Sheets

(56) References Cited

U.S. PATENT DOCUMENTS

| | | | | |
|---|---|---|---|---|
| 6,498,404 | B1* | 12/2002 | Thuringer | G06F 21/755 307/32 |
| 8,583,944 | B1* | 11/2013 | Trimberger | G06F 11/3058 713/194 |
| 9,547,027 | B2* | 1/2017 | Varma | G06F 1/3243 |
| 2007/0160196 | A1* | 7/2007 | Timmermans | G06F 21/755 380/28 |
| 2007/0294519 | A1* | 12/2007 | Miller | G06F 9/3808 712/241 |
| 2012/0005466 | A1* | 1/2012 | Wagner | G06F 21/755 713/2 |
| 2012/0210138 | A1* | 8/2012 | Tucker | G06F 21/755 713/189 |
| 2016/0132033 | A1* | 5/2016 | Kao | G05B 19/40937 700/291 |
| 2016/0299553 | A1* | 10/2016 | Putnam | G06F 1/3293 |
| 2017/0373837 | A1* | 12/2017 | Gagnerot | H04L 9/003 |

OTHER PUBLICATIONS

Rammohan, Srividhya. Reduced Complementary Dynamic and Differential Cmos Logic: A Design Methodology for Dpa Resistant Cryptographic Circuits. Diss. University of Cincinnati, 2007. (Year: 2007).*
European Patent Office Application No. 17730905.1-1218 "Communication Pursuant to Article 94(3) EPC" dated Jan. 21, 2020.
International Searching Authority Application No. PCT/GB2017/051681, "International Search Report"; dated Aug. 7, 2017.

* cited by examiner

APPARATUS AND METHOD FOR MASKING POWER CONSUMPTION OF A PROCESSOR

CROSS-REFERENCE TO RELATED APPLICATIONS

This application is a continuation-in-part of application Ser. No. 15/185,789, filed Jun. 17, 2016.

TECHNICAL FIELD

The present technique(s) relate to an apparatus and system for masking the power consumption associated with logic operations of a processor

BACKGROUND

Modern microprocessors may utilize various logic circuitry to perform various logic operations. These logic operations may include the execution of various instructions carried out by functional blocks of the processor's logic circuitry. The instructions carried out by the processor may be of various types such as data processing instructions, computational instructions, storage instructions, as well as other information instructions. The operations and associated instructions may be carried out sequentially or in parallel and/or may be performed as part of a "pipeline," in which multiple instructions may be executed at multiple stages of a processor at the same time.

The operations and instructions performed by the processor may be susceptible to monitoring for reverse engineering purposes. For example, the processor may consume an amount of power during the execution of a logic operation and associated instruction. The monitoring of the processor's changing power consumption may enable identification of the logic operation being performed and may enable reverse engineering of code associated with the instruction that was performed.

This problem becomes more significant when the operations and instructions involve steps of a cryptographic algorithm used to secure data and other information. For example, the logic operations and associated instructions performed by a processor may involve steps of a cipher algorithm associated with an encryption standard such as the Advanced Encryption Standard (AES) or the Data Encryption Standard (DES) or a Rivest, Shamir, Aldeman (RSA) cryptosystem. Analysis of a processor's power consumption associated with cryptographic operations/instructions may reveal various cryptographic steps (e.g., steps involving cryptographic "keys") which may result in the compromise of information security.

One such analysis may include the power monitoring techniques of Differential Power Analysis (DPA) that enable the identification of "keys" of cryptographic algorithms associated with various encryption standards. To illustrate, as part of a DPA attack on a processor, power consumptions for different instructions (e.g., cipher instructions) may be estimated and coupled with the monitoring of the processor's power consumption. The DPA attack may reveal the operations/instructions (e.g., cryptographic steps and/or keys) that are executed by functional blocks of the processor.

In traditional cryptographic devices, the possibility of a DPA attack has driven designers to use various techniques to conceal the power consumption required by each instruction and/or round(s) of the chosen cryptographic algorithm. To date, no technique has been discovered that can accurately obscure or mask the power consumption associated with the operations/instructions of a processor as they are being executed. This has resulted in a need to accurate and timely concealment of the operations involved at each stage of the algorithm from a determined attacker.

BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems, or apparatuses described herein.

DETAILED DESCRIPTION

Figure 1:
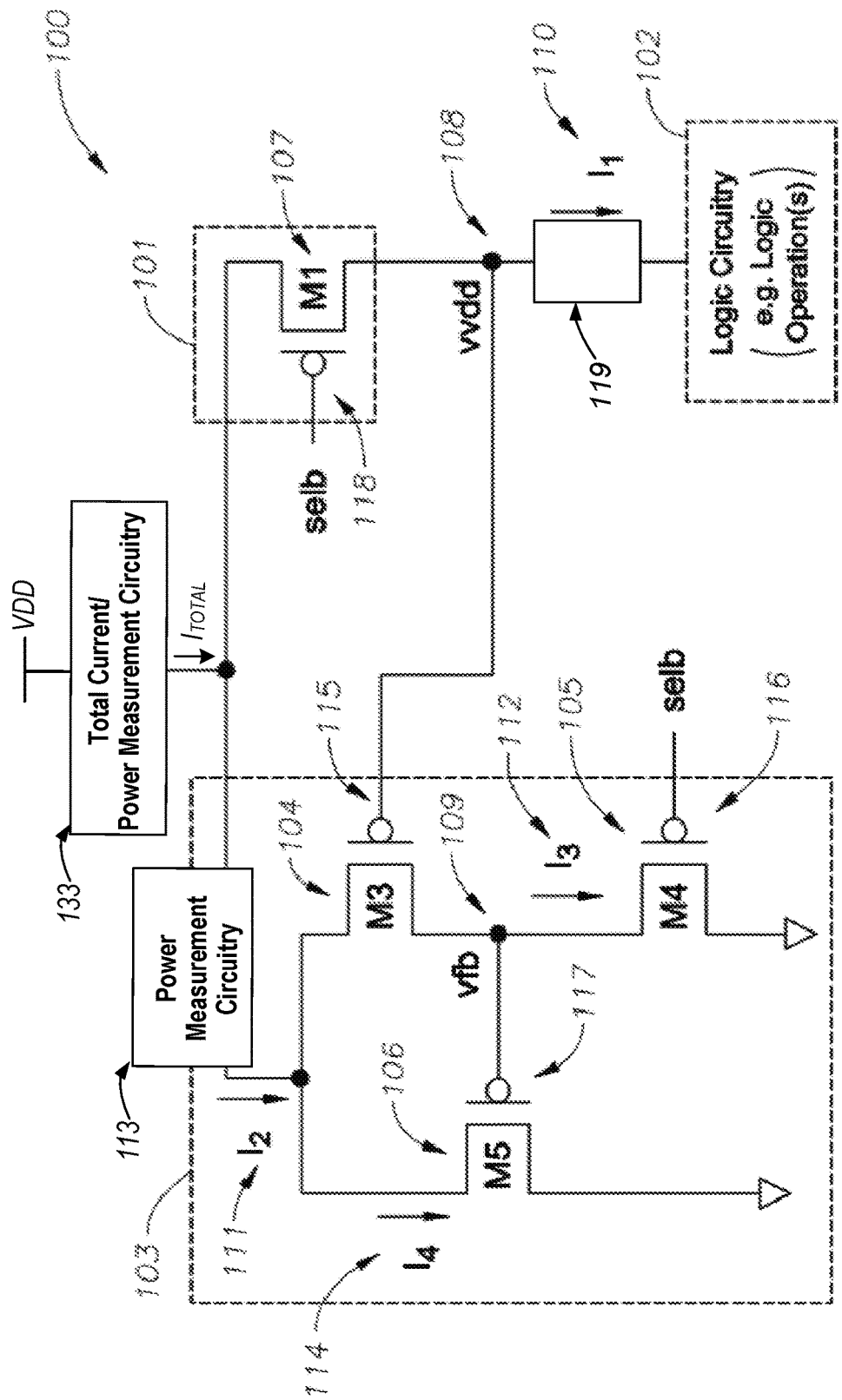
FIG. 1 is a circuit diagram schematically illustrating an apparatus for masking power consumption of a processor in accordance with an embodiment described herein.

Before discussing the embodiments with reference to the accompanying figures, a brief description of various embodiments is provided. A first embodiment may include an apparatus for masking a first power consumption associated with one or more operations performed by logic circuitry of the apparatus. The apparatus may include circuitry configured to generate a second power consumption, wherein the second power consumption is predictively generated to vary based on the first power consumption. The second power consumption may vary in a manner that is complementary to the first power consumption. The second power consumption and the first power consumption may combine to produce a substantially constant power consumption. The second power consumption and the first power consumption may combine to produce a substantially constant consumption on a clock-cycle-by-clock-cycle basis. In an embodiment, the current associated with the first power consumption and a current associated with the second power consumption may combine to produce a substantially constant current on a clock-cycle-by-clock-cycle basis.

The above-identified apparatus may additionally include a storage device to store power consumption parameters, wherein the second power consumption is predictively generated based on the stored power consumption parameters. Power consumption parameters may be stored in a storage device that includes a nonvolatile memory following a first measurement of actual power consumption parameters. Stored power consumption parameters may be updated following one or more subsequent measurements of actual power consumption parameters, in which the one or more subsequent measurements follow the first measurement. In some embodiments, the apparatus may additionally include an update module to update the stored power consumption parameters based on measured power consumption parameters of at least one of the one or more operations performed by the logic circuitry. In one embodiment, the power consumption parameters may relate to one or more pipeline operations to be performed by the logic circuitry. The one or more pipeline operations may include at least one cryptographic security operation. In some embodiments, an estimate of the first power consumption may be based on a prediction of the first power consumption. In addition to a prediction, an estimate of power consumption may be based on a variety of other factors, such as scaling based on one or more similar operations that may be fewer in number and/or of a reduced complexity, or on operations that may be greater number and/or of an increased complexity. Accordingly, as used herein, the terms "estimate," "estimating," or "estimation," are intended embrace a wide variety of predicting, scaling, forecasting, computing, inferring, and approximating, for example, and claimed subject matter is intended to embrace all of these operations and combinations thereof.

In another embodiment, an apparatus for masking a first power consumption associated with one or more operations performed by logic circuitry of the apparatus may include circuitry configured to generate a second power consumption, wherein the second power consumption may complement the first power consumption to form a substantially constant power consumption. The second power consumption and the first power consumption may combine to form the substantially constant power consumption on a clock-cycle-by-clock-cycle basis. The second power consumption may be generated in response to access of power consumption parameters for logic operations stored via a storage device. In an embodiment, the logic operations may include one or more pipeline operations. In an embodiment, the one or more pipeline operations may relate to at least one cryptographic security operation.

In another embodiment, an apparatus for masking a first power consumption associated with one or more operations performed by logic circuitry of the apparatus may include circuitry configured to generate a second power consumption. The second circuitry may consume a second power, in which the second power complements the first power such that the sum of the first power and the second power combine to form a substantially constant power consumption. The circuit may additionally include a storage device to store power consumption parameters of the first power based on operations performed by the logic circuitry. In an embodiment, the second power consumption may be predictively generated based on the stored power consumption parameters. In an embodiment, the stored power consumption parameters may be stored on a clock-cycle-by-clock-cycle basis.

In another embodiment, a method for masking a first power consumption associated with a first operation performed by logic circuitry may include estimating a power consumed by the logic circuitry, determining a difference between the estimated power and a target power consumption, and configuring a power-complementing circuit to consume the difference between the estimated power and the target power consumption. In an embodiment, the estimating of the power consumption by the logic circuitry may further include accessing a storage device to obtain an estimated power consumption for the first operation. In an embodiment, the method may additionally include measuring an actual power consumed by the logic circuitry and updating a storage device with a revised estimated power consumption based at least in part on a measured power consumed by the logic circuitry. In another embodiment, the method may include updating the storage device with a revised power consumption based at least in part on a measured power consumed by the logic circuitry when the logic circuitry performs a second operation that is different from the first operation. In an embodiment, the method may additionally include measuring an actual power consumed by the logic circuitry and updating a storage device with a revised estimation of power consumption based at least in part on a measured power consumed by the logic circuitry when the logic circuitry performs the first operation utilizing a bit pattern that is different than an actual bit pattern utilized in performing the first operation. The different bit pattern may be generated via performing a masking function that utilizes the actual bit pattern.

A processor may comprise various logical components (e.g., functional blocks) that may each perform specific logic operations with the execution of associated instructions. The performance of each operation and associated instruction may have a corresponding power consumption that contributes to the total power consumption of the processor. Accordingly, as more logic operations are performed, a corresponding increase in power consumption for the processor may occur. The monitoring and analysis of a processor's power consumption (e.g., DPA techniques) may undesirably reveal the logic operations performed, the instruction code executed, or both. The apparatuses and methods described herein may be integrated with the logic components of a processor to provide for the accurate masking or obscuring of the power consumption associated with the operations/instructions performed by the logic components of the processor.

Such obscuring or masking techniques may improve the security and integrity of data being processed by the processor. Additionally, it may be advantageous to provide techniques to control the timing and activation of the power consumption masking. Such techniques may improve the performance, reliability, and efficiency of the processor when performing either secure or non-secure operations/instructions on data.

For example, in a non-limiting embodiment, an apparatus may comprise header circuitry and complementary power consumption circuitry configured to be connected or coupled to logic circuitry of a processor. As logic operations are performed by the logic circuitry, a corresponding increase or decrease in power consumption of the logic circuitry may occur. The power-complementing circuitry may complement the power consumption of the logic circuitry by providing a current and corresponding power consumption that is negatively correlated with the power consumption of the logic circuitry. In this context, the term "power-complementing circuitry" is defined as circuitry that operates to consume power that is complementary to the power consumed by logic circuitry such that the combination of the power consumed by the logic circuitry and the power-complementing circuitry remains substantially constant. Thus, power-complementing circuitry may operate to mask or obscure the power consumption of the logic circuitry of the processor. Thus, for example, when power consumption of the logic circuitry increases, power consumption by the complementing circuitry may decrease. Further, when power consumption of the logic circuitry decreases, power consumption by the complementing circuitry may increase. Accordingly, it may be difficult, or perhaps virtually impossible, to determine the processing operations being performed by the logic circuitry by observing the power consumed by the combination of the logic circuitry and the complementing circuitry.

In another non-limiting embodiment, an apparatus may comprise header circuitry and power-complementing circuitry configured to receive a selection signal. As logic operations are performed by the logic circuitry, a corresponding increase or decrease in power consumption of the logic circuitry may occur. The power-complementing circuitry may predictively complement the power consumption of the logic circuitry by providing a current, and corresponding power consumption, that is negatively correlated with the power consumption of the logic circuitry. In receiving the selection signal, the timing of complementing the power consumption associated with the logic circuitry may be controlled. As such, the power consumed by the power-complementing circuitry and the logic circuitry may more accurately combine to form a substantially constant power consumption of the apparatus. In this manner, the apparatus may timely obscure or mask the power consumption associated with the logic circuitry of the processor.

In one embodiment, an apparatus for masking power consumption associated with logic circuitry of a processor is provided so as to enable improvements in the security and integrity of data being processed by the processor. In another embodiment, the apparatus may also provide improved performance, reliability, and efficiency of the processor when performing either secure or non-secure operations/instructions on data.

The apparatuses and methods described herein may be applied to fabrication technologies utilized in forming various types of devices such as, but not limited to, planar devices, multi-gate devices (e.g., FinFET devices), or a combination of both. The apparatuses and methods described herein may be process-independent such that they may be applied to various process and/or device fabrication technologies. For example, the apparatuses and methods may be applied to current fabrication technologies and any future fabrication technologies having reduced process geometries and\or that utilize various lithographic techniques (e.g., double patterning technique (DPT)).

The apparatuses and methods described herein may be associated with one or more standard cells of a fabrication technology so as to enable the automated design of an integrated circuit (IC) with power consumption masking capability. To illustrate, a standard design flow may provide netlists (e.g., schematic level and/or layout level netlists) that may include the apparatuses used for masking the power consumption associated with logic modules of the IC design. Alternatively, or in addition to, the apparatuses and methods described herein may be associated with of one or more engineering change order (ECO) steps used to make changes to a standard design flow. For example, a standard design flow may be modified utilizing ECO steps to provide modified netlists that include the apparatuses used for masking the power consumption associated with logic modules of the IC design.

Particular embodiments will now be described with reference to the figures.

Referring to FIG. 1, a circuit diagram schematically illustrating an exemplary design of an apparatus for masking the power consumption associated with logic circuitry of a processor is shown and generally designated 100. The apparatus 100 includes a header circuitry 101 connected or coupled to a first reference voltage supply (e.g., VDD) and to a logic circuitry 102 that may be associated with the processor or may be associated with any other type of processing entity, such as a state machine, for example. The apparatus 100 also includes a power-complementing circuitry 103 coupled or connected to the first reference voltage supply (e.g., VDD) and to a second reference voltage supply (e.g., ground, or VSS). The power-complementing circuitry 103 and the header circuitry 101 may each be connected to the logic circuitry 102 at a common node 108 (e.g., a virtual VDD (vvdd) node).

The header circuitry 101 may comprise a first p-channel metal-oxide-semiconductor (PMOS) transistor 107 (e.g., transistor M1). The first PMOS transistor 107 may be coupled to the first reference voltage supply and may be coupled to the logic circuitry 102 via the common node 108. The first PMOS transistor 107 may include a gate terminal 118 configured to receive a selection bar (selb) signal from control circuitry (not shown). The selb signal may be an inverse signal of a selection (sel) signal. The header circuitry 101 may be configured to enable the common node 108 to comprise a voltage that may vary in correspondence to one or more logic operations performed by the logic circuitry 102 of the processor. For example, the first PMOS transistor 107 may receive the selb signal at its gate terminal 118 which may activate the first PMOS transistor 107 to turn "on" and enable a voltage at the common node 108. The activation of the first PMOS transistor 107 may also enable the logic circuitry 102 to perform one or more logic operations. The first PMOS transistor 107 may enable the generation of a first current 110 (e.g., the current $I_1$) that may vary in correspondence to the one or more logic operations performed by the logic circuitry 102. The first current 110 may correspond to a power consumption associated with the one or more logic operations performed by the logic circuitry 102. The power/current measuring circuitry 119 may operate to measure current $I_1$ and/or power consumed by the logic circuitry 102.

In operation, a total power, such as a power consumed by the logic circuitry 102 and the power-complementing circuitry 103, may be measured by the total current/power measurement circuitry 133. In the embodiment of FIG. 1, this measurement may be utilized as a baseline value, from which power to be consumed by the power-complementing circuitry 103 may be calculated. Thus, in one or more embodiments, as the power/current measuring circuitry 119 measures, for example, a decreased power and/or current consumed by the logic circuitry 102, power consumed by the power-complementing circuitry 103 may be increased so as to maintain the baseline value of power consumption value as measured via measurement circuitry 133. This may be represented symbolically utilizing the expression below:

$$I_{TOTAL} = I_1 + I_2$$

Thus, to maintain $I_{TOTAL}$ at a constant (or baseline) value, such as a maximum value, as $I_1$ decreases, $I_2$ increases.

In certain embodiments, one of the total current/power measuring circuitry 133 and the power measurement circuitry 113 may not be utilized. To illustrate, if the total current/power measurement circuitry 133 is not present, for example, and $I_{TOTAL}$ is known to be, for example, 1.0 mA, when $I_1$ comprises a decreased value, $I_2$ may be increased in a complementary manner so as to maintain a constant $I_{TOTAL}$. In another example, if the power measurement circuitry 113 is not present, when $I_1$ comprises a decreased value, power consumed by power-complementing circuitry 103 may be proportionally increased until the total current/power measurement circuitry 133 measures a desired value for $I_{TOTAL}$.

The power-complementing circuitry 103 may comprise a second PMOS transistor 104 (e.g., transistor M3), a third PMOS transistor 105 (e.g., transistor M4), and a fourth PMOS transistor 106 (e.g., transistor M5). The power-complementing circuitry 103 may be configured to provide a second power consumption to complement the power consumption associated with the one or more logic operations performed by the logic circuitry 102. The second PMOS transistor 104 may be connected to the first reference voltage supply (e.g., VDD) and may be connected to the third PMOS transistor 105 via a first node 109 (e.g., node vfb). The second PMOS transistor 104 may include a gate terminal 115 that is connected to the logic circuitry 102 via the common node 108 (e.g., node vvdd).

The third PMOS transistor 105 may be connected between the first node and the second reference voltage supply (e.g., ground, or VSS) and may include a gate terminal 116 configured to receive the selb signal from control circuitry (not shown). In a particular embodiment, the third PMOS transistor 105 of the power-complementing circuitry 103 and the first PMOS transistor 107 of the header circuitry 101 may both receive the selb signal from control circuitry. In this manner, the power-complementing circuitry 103 and the header circuitry 101 may be controlled by a common selection signal.

In an alternative embodiment, the third PMOS transistor 105 may receive a second selb signal (selb2) that is different from the selb signal. The selb2 signal may be associated with timing control of the third PMOS transistor 105 that may be independent of the control of the header circuitry 101. In this manner, the header circuitry may be controlled by a first selection signal (e.g., the selb signal) and the complementing circuitry is controlled by a second selection signal (e.g., the selb2 signal) that is different from the first selection signal. The second PMOS transistor 104 and the third PMOS transistor 105 may be associated with a third current 112 (e.g., the current $I_3$) that is a portion of a second current 111 (e.g., the current $I_2$). The second PMOS transistor 104 and the third PMOS transistor 105 may individually or in combination enable voltage adjustment at the first node 109 so as to increase the accuracy of the second power consumption used to directly complement the power consumption associated with the one or more logic operations performed by the logic circuitry 102.

The fourth PMOS transistor 106 may be connected to the first reference voltage supply (e.g., VDD) and may be connected to the second reference voltage supply (e.g., ground, or VSS). The fourth PMOS transistor 106 may include a gate terminal 117 connected to the first node 109 (vfb) and configured to receive the voltage at the first node 109. The fourth PMOS transistor 106 may be configured to drain a fourth current 114 (e.g., the current $I_4$) and to exhibit a corresponding second power consumption that may be used to complement the power consumption associated with the one or more logic operations performed by the logic circuitry 102.

The apparatus 100 may include transistors exhibiting different threshold voltage values. For example, the header circuitry 101 may comprise the first PMOS transistor 107 that is configured to comprise a threshold voltage that is greater than a threshold voltage of at least one or more PMOS transistors of the power-complementing circuitry 103. As another example, the power-complementing circuitry 103 may comprise the third PMOS transistor 105 that is configured to exhibit a threshold voltage that is greater than either a threshold voltage of the second PMOS transistor 104 or a threshold voltage of the fourth PMOS transistor 106, or both. In a particular embodiment, the apparatus 100 may include transistors that comprise the same threshold voltage values. For example, the first PMOS transistor 107 may be configured to comprise a threshold voltage that is substantially similar to a threshold voltage of the third PMOS transistor 105.

To illustrate, the first PMOS transistor 107 of the header circuitry 101 and the third PMOS transistor 105 of the power-complementing circuitry 103 may be configured to comprise a substantially similar threshold voltage, such as a "regular" threshold voltage associated with a process technology. For example, the regular threshold voltage may be an average or normal threshold voltage designated for the process technology. The second PMOS transistor 104 and the fourth PMOS transistor 106 of the power-complementing circuitry 103 may be configured to comprise a "low" threshold voltage that is less than the "regular" threshold voltage associated with the process technology. In this manner, the third PMOS transistor 105 may be configured to have a threshold voltage that is greater than a threshold voltage of the second PMOS transistor 104 and greater than a threshold voltage of the fourth PMOS transistor 106. In particular embodiments, when the second PMOS transistor 104 and the fourth PMOS transistor 106 exhibit a relatively low threshold voltage, such as with respect to the threshold voltage of the third PMOS transistor 105, the transistors 104 and 106 may be activated (e.g., turned "on") utilizing a gate voltage lower than a gate voltage to activate the PMOS transistor 105. In certain embodiments, a relatively fast and/or early turn on of the transistors 104 and 106 may provide a more accurate response to variations in vvdd. Accordingly, variations in the current $I_1$, which may bring about variations in vvdd, may give rise to the PMOS transistor 104 operating to turn on/off the PMOS transistor 106. Such turning on/off of the PMOS transistor 106 may bring about the complementary current path through the power-complementing circuitry 103.

The apparatus 100 may include transistors configured to comprise different sizes. In particular embodiments, transistor "size" may refer to one of several dimensions, W (width) or L (length) of the transistor. The W/L ratio may be directly proportional to the current that flows from drain to source in either the linear or saturated operating modes. This drain-to-source current may correspond to the main component of the active or switching power. In particular embodiments in which size ratios are discussed, the W (which may refer to width), may correspond to the dimension that is being used. However, certain embodiments may refer to "low-power mode, retention mode." In this context, a discussion of low power mode and/or retention mode may refer to a situation in which leakage current may be suppressed. In suppressing leakage, increasing the channel length may correspond to another approach toward reducing leakage current as well as reducing threshold voltage. In instances involving leakage suppression, both the W and the L sizes are included in the discussion.

Transistors of the apparatus 100 may be configured to have different sized widths resulting in different width ratios. For example, the power-complementing circuitry 103 may comprise transistors having different sizes such that a size of the second PMOS transistor 104 and a size of the third PMOS transistor 105 may comprise a ratio of 3 to 1. To illustrate, the size of the second PMOS transistor 104 may be three times the size of the third PMOS transistor 105. Such sizing may enable the first node 109 (vfb) to comprise a voltage value that is greater than half the first reference voltage supply (e.g., greater than VDD/2). In another example, a size of the fourth PMOS transistor 106 of the power-complementing circuitry 103 and a size of a first PMOS transistor 107 of the header circuitry 101 may comprise a ratio of 1.5 to 1. In a particular embodiment, the second PMOS transistor 104 and fourth PMOS transistor 106 of the power-complementing circuitry 103 may be sized to provide accurate complementing of the power consumption (e.g., a first power consumption) associated with the one or more operations of the logic circuitry 102.

In another embodiment, the sizing of transistors of the power-complementing circuitry 103 and the header circuitry 101 may be based, on the logic operations performed by the logic circuitry 102. For example, the second PMOS transistor 104 and the fourth PMOS transistor 106 of the power-complementing circuitry 103 may be sized based on estimated power consumption values associated with the logic circuitry 102. Such sizing may enable the generation of a current (e.g., the fourth current 114) and a corresponding second power consumption which may be used to complement the power consumption of one or more logic operations performed by the logic circuitry 102.

In a particular embodiment, the various sizes of the transistors (e.g., the second PMOS transistor 104 and fourth PMOS transistor 106) of the apparatus 100 may be sized in a custom manner. For example, in a non-limiting embodiment, the fourth PMOS transistor 106 may be sized to provide a complementary current/power consumption (e.g., the fourth current 114) that is at least negatively correlated with the first current 110 (e.g., $I_1$). After the fourth PMOS transistor 106 has been sized, a size of the second PMOS transistor 104 and a size of the third PMOS transistor 105 may be adjusted in accordance with the sizing of the fourth PMOS transistor 106 to provide a size ratio that is greater than or equal to a 2 to 1 ratio (e.g., a 3 to 1 ratio). In another embodiment, the various sizes of the transistors (e.g., the second PMOS transistor 104 and the fourth PMOS transistor 106) of the apparatus 100 may be part of a standard cell library of a process technology to enable automated transistor sizing for automated configuration of the power-complementing circuitry 103.

The power-complementing current (e.g., the fourth current 114) may be generated and/or adjusted by the sizing of the second PMOS transistor 104 and the third PMOS transistor 105. To Illustrate, the second PMOS transistor 104 and the third PMOS transistor 105 may be configured to effectively form a voltage divider. The second PMOS transistor 104 and the third PMOS transistor 105 may be sized relative to each other (e.g., a size ratio of 3 to 1) to enable the modulation of a voltage at the first node 109 (vfb). Such modulation of the first node 109 may further modulate the fourth PMOS transistor 106 to generate and/or adjust the complementary current (e.g., the fourth current 114 ($I_4$)). In another embodiment, the complementary current may be generated and/or adjusted by the sizing of the fourth PMOS transistor 106 so as to generate and/or adjust the complementary current to have a negative correlation with the first current 110 (e.g., $I_1$). Such sizing of transistors of the power-complementing circuitry 103 may enable the generation of a current (e.g., the fourth current 114) and a corresponding second power consumption which may be used to complement the power consumption of one or more logic operations performed by the logic circuitry 102.

The logic circuitry 102 may be associated with one or more functional blocks that perform one or more logic operations. The logic operations performed by the logic circuitry 102 may include, but are not limited to, any number of processor operations, such as data processing operations, arithmetic operations, logical operations, encryption/decryption operations, etc. In a particular embodiment, the logic operations may correspond to one or more pipeline steps carried out by the processor. For example, the logic operations may involve various pipeline steps such as instruction fetch steps, instruction decode and register steps, instruction execution steps, memory access steps, and register write steps.

In another embodiment, the logic operations may correspond to one or more stages of a cryptographic algorithm. For example, the logic operations may involve "keyed" cryptographic steps such as, but not limited to, key expansion steps, combination steps, substitution steps, transposition steps, mixing steps, etc. The logic operations may correspond to cryptographic algorithms that are associated with one or more encryption standards. For example, the logic operations may involve instructions and steps related to an Advanced Encryption Standard (AES) or a Data Encryption Standard (DES) or a Rivest, Shamir, Aldeman (RSA) cryptosystem.

The power-complementing circuitry 103 may enable the generation of the second current 111 (e.g., the current $I_2$) that may comprise the third current 112 (e.g., the current $I_3$) and the fourth current 114 (e.g., the current $I_4$). In a particular embodiment, the fourth current 114 may have a value that is substantially greater than a value for the third current 112. In one particular embodiment, the complementary nature of the second current 111 (e.g., $I_2$) with respect to the first current 110 (e.g., $I_1$) may be illustrated in accordance with Table I, below:

TABLE I

| First Current 110 ($I_1$) | Second (Complementary) Current ($I_2$) | Combined Current ($I_{total}$) |
| --- | --- | --- |
| 0.2 mA | 0.8 mA | 1.0 mA |
| 0.4 mA | 0.6 mA | 1.0 mA |
| 0.6 mA | 0.4 mA | 1.0 mA |
| 0.8 mA | 0.2 mA | 1.0 mA |

Accordingly, from the example of Table I, $I_1$ and $I_2$ combine to form $I_{total}$, which may correspond to the maximum current for the apparatus 100. As illustrated in Table I, as the first current 110 increases, such as from 0.2 mA to 0.8 mA, the second current 111 decreases, such as from 0.8 mA to 0.2 mA. However, in the example of Table 1, a combined current remains substantially constant (e.g., 1.0 mA).

During operation, the apparatus 100 may provide a second power consumption that may complement a power consumption associated with operations/instructions carried out by logic circuitry of a processor. For example, the power-complementing circuitry 103 and the header circuitry 101 may each receive the selb signal. The selb signal may have a logical value of 0 and a corresponding "low" voltage value (e.g., voltage value corresponding to ground, VSS, or low voltage source of a process technology). In receiving the selb signal, the first PMOS transistor 107 of the header circuitry 101 and the third PMOS transistor 105 of the power-complementing circuitry 103 may be substantially "on."

While the first PMOS transistor 107 is turned to an "on" state, the common node 108 may exhibit a voltage that corresponds to the operation of one or more functional blocks of the logic circuitry 102. Additionally, the first current 110 may exhibit a current that also corresponds to the operation of one or more functional blocks of the logic circuitry 102. For example, in a first case, for a given instance, as the logic circuitry 102 operates additional functional blocks and/or performs additional operations/instructions, the logic circuitry 102 may drain more current such that the first current 110 may increase. The logic circuitry 102 may exhibit a corresponding increase in power consumption, and the common node 108 (e.g., node vvdd) may exhibit a corresponding decrease in voltage. Similarly, in a second case, as the logic circuitry 102 operates fewer functional blocks and/or performs fewer operations/instructions, the logic circuitry 102 may drain less current such that the first current 110 may decrease. The logic circuitry 102 may exhibit a corresponding decrease in power consumption, and the common node 108 may exhibit a corresponding increase in voltage.

During the first case, where the first current 110 may increase and the logic circuitry 102 exhibits a corresponding increase in power consumption, the decreasing voltage at the common node 108 may enable the second PMOS transistor 104 of the power-complementing circuitry 103 to become more strongly "on." In the context of FIG. 1, the PMOS transistors 104 may draw much less current than the PMOS transistor 106. Additionally, and also in the context of FIG. 1, the second PMOS transistor 104 and the PMOS transistor 105 may be balanced, which may keep the voltage at the gate terminal 117 close to a threshold value so that the PMOS transistor 106 may turn "on" responsive to a small change in vvdd. In certain embodiments, such small changes in vvdd may bring about a relatively large change in the current 114 conducting through the PMOS transistor 106. Thus, when the second PMOS transistor 104 is turned to an "on" state, the first node 109 (e.g., node vfb) may exhibit a corresponding increase in voltage that may enable the fourth PMOS transistor 106 to become more strongly "off" (e.g., conducting less current, such as leakage current, in a subthreshold operating region.) This may cause the fourth current 114 to correspondingly decrease for a corresponding decrease in a second power consumption used for complementing the power consumption of the logic circuitry 102. In this manner, as the logic circuitry 102 increases operations/instructions with a corresponding increase in power consumption, the power-complementing circuitry 103 may provide a current (e.g., the current 114) and a corresponding second power consumption that complements the power consumption of the logic circuitry 102.

Similarly, during the second case, where the first current 110 may decrease and the logic circuitry 102 exhibits a corresponding decrease in power consumption, the increasing voltage at the common node 108 may enable the second PMOS transistor 104 of the power-complementing circuitry 103 to become more strongly "off." Conversely, as the voltage at the common node 108 decreases, such decrease brings about an increased current flow through the second PMOS transistor 104. Accordingly, the lower the gate voltage at the second PMOS transistor 104 the greater the current flow through transistor 104. Additionally, while the second PMOS transistor 104 is off, the first node 109 (e.g., node vfb) may exhibit a corresponding decrease in voltage (e.g., the voltage may return to a reference voltage). This may cause the fourth current 114 to correspondingly increase for a corresponding increase in the second power consumption used for complementing the power consumption of the logic circuitry 102. In this manner, as the logic circuitry decreases operations/instructions with a corresponding decrease in power consumption, the power-complementing circuitry 103 may provide a current (e.g., the current 114) and a corresponding second power consumption that complements the power consumption of the logic circuitry.

It is to be understood that the connection of the power-complementing circuitry 103 to the logic circuitry 102 via the common node 108 may modulate the activity of the second PMOS transistor 104. Such modulated activity of the second PMOS transistor 104 may provide adjustment of the voltage at the first node 109 (vfb) to enable the modulation of the fourth PMOS transistor 106 and the associated second power consumption generated by the power-complementing circuitry 103. In this way, the coupling of the power-complementing circuitry 103 to the logic circuitry 102 may enable the power-complementing circuitry 103 to provide a second power consumption with an increased accuracy for directly complementing the power consumption associated with the one or more operations of the logic circuitry 102.

Accordingly, as logic operations and power consumption of the logic circuitry 102 increase to approach a maximum power consumption for the apparatus 100, the power-complementing circuitry 103 may provide a second power consumption value that would act to mask or obscure the total power consumption of the logic circuitry and its associated processor. For illustrative purposes, in a non-limiting example, the logic circuitry 102 may perform a logical operation that corresponds to a power consumption that is one fourth of the maximum power consumption available to the apparatus 100. In the manner described herein, the power-complementing circuitry 103 may provide a second power consumption (via an associated current drain) that is three fourths of the maximum power consumption available to the apparatus 100.

Accordingly, it is to be understood that although the power consumption of the logic circuitry 102 may have a particular value (e.g., one fourth of the maximum power consumption), the total power consumption associated with the processor may be of a different value (e.g., the maximum power consumption) that results from the combination of the power consumption for the logic circuitry 102 and the second power consumption provided by the power-complementing circuitry 103. In this way, the power-complementing circuitry 103 may provide a second power consumption value that would act to mask the total power consumption of the logic circuitry and its associated processor.

The apparatus 100 and its masking operations may be associated with other processor modes of operation such as, but not limited to, a secure mode, low-power mode, or other modes of operation for the processor. The masking of the power consumption associated with logic circuitry 102 of a processor may provide improvements in the security and integrity of data, operations, and instructions that are processed. For example, in cases where a processor and the operations/instructions it executes are subject to undesired monitoring/analysis, such as during a DPA attack, the apparatus 100 via the power-complementing circuitry 103 may mask or obscure the power consumption of the processor (e.g., a DPA mode of the apparatus). Such masking may obstruct or thwart the undesired monitoring/analysis of the processor, its associated operations/instructions and corresponding power consumption to provide improved security of the data and operations (e.g., cryptographic data and/or operations) processed by components of the processor.

Figure 2:
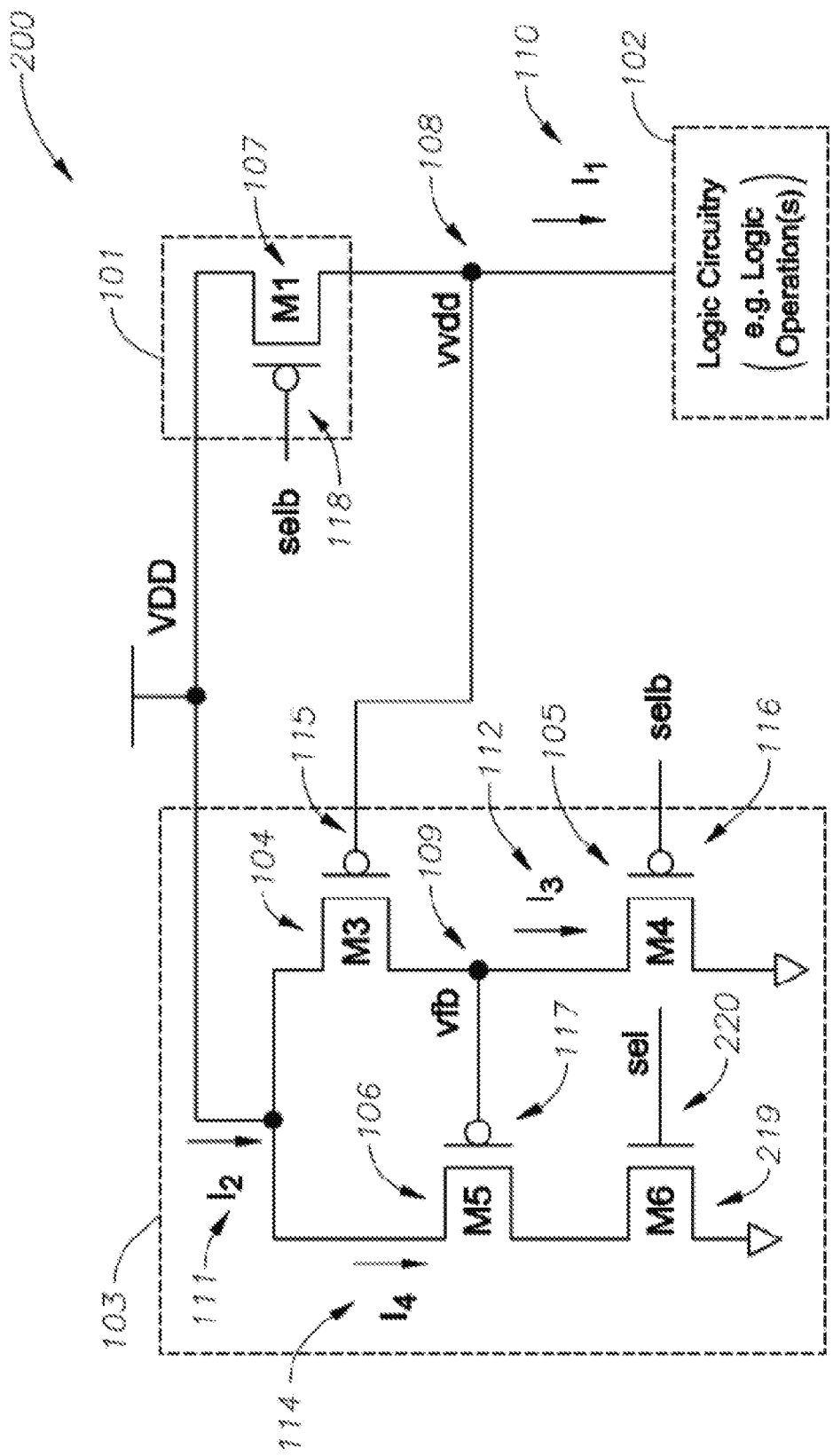
FIG. 2 is a circuit diagram schematically illustrating an apparatus for masking power consumption of a processor in accordance with another embodiment described herein.

Referring to FIG. 2, a circuit diagram schematically illustrating another design of an apparatus for masking the power consumption associated with logic circuitry of a processor is shown and generally designated 200. The apparatus 200 may be substantially similar to the apparatus 100 of FIG. 1 but may include and/or omit other components. For example, in contrast to the apparatus 100 of FIG. 1, the apparatus 200 may have a power-complementing circuitry 103 that includes a first n-channel metal-oxide-semiconductor (NMOS) transistor 219 (e.g., transistor M6). The first NMOS transistor 219 may be connected to a fourth PMOS transistor 106 (e.g., transistor M5) of the power-complementing circuitry 103 and may be connected to a second reference voltage supply (e.g., ground, or VSS).

The first NMOS transistor 219 may have a gate terminal 220 configured receive a selection (sel) signal from control circuitry (not shown).

The apparatus 200 may operate in a manner substantially similar to that of the apparatus 100 of FIG. 1 but may include and/or omit other operations. For example, the apparatus 200 may be configured to operate in a low-power mode associated with the processor. To illustrate a particular embodiment, during operation, a gate terminal 118 of a first PMOS transistor 107 of the header circuitry 101 and a gate terminal 116 of a third PMOS transistor 105 of the power-complementing circuitry 103 may receive a selection bar (selb) signal from control circuitry (not shown). In another embodiment, the third PMOS transistor 105 may be controlled by a second selection bar (selb2) signal that is different from the selb signal. The selb2 signal may be associated with timing control of the third PMOS transistor 105 that may be independent of the control of the header circuitry 101.

The selb signal may be an inverse of the signal selection (sel) signal. The selb signal may provide a logical value of 1 (e.g., a corresponding "high" voltage value such as VDD voltage, a voltage greater than a threshold voltage, etc.) to the transistors 105 and 107. The first NMOS transistor 219 may have a gate terminal 220 configured receive the sel signal from the control circuitry (not shown). The sel signal may provide a logical value of 0 corresponding to a "low" voltage value (e.g., a voltage value corresponding to ground, VSS, or low voltage source of a process technology) to the gate terminal 220 of the first NMOS transistor 219.

Accordingly, the first PMOS transistor 107, the third PMOS transistor 105, and the first NMOS transistor 219 may each be substantially "off." In this case, having the first NMOS transistor 219 in an "off" state may prevent the fourth PMOS transistor 106 from leaking current to a ground terminal. In this manner, less power is consumed by the power-complementing circuitry 103 which may correspond to the apparatus 200 operating in a low-power mode. The low power mode may correspond to a sleep mode associated with the processor. In the case where the first PMOS transistor 107 and the third PMOS transistor 105 are substantially "on" by their receipt of the selb signal providing a logical value of 0, the first NMOS transistor 219 may also be substantially "on" by its receipt of the sel signal providing a logical value of 1. In this manner, the apparatus 200 may provide for the masking of the power consumption associated with the logic circuitry 102 while also providing means for reducing current leakage for a low-power mode associated with the processor. The low-power mode may be associated with instances where logic operations are not performed (e.g., a sleep mode of a processor). In another embodiment, the low power mode may be associated with instances where logic operations are performed and the undesired monitoring/analysis of the processor is not a concern (e.g., a non-DPA mode of operation). In such a case (not shown), the first NMOS transistor 219 and the third PMOS transistor 105 may receive selection signals that are independent of the selection bar (selb) signal received by the first PMOS transistor 107. To illustrate, a selection (sel) signal received by the first NMOS transistor 219 and a second selection bar (selb2) signal received by the third PMOS transistor 105 may both be independent of the selection bar (selb) signal received by the first PMOS transistor 107.

Figure 3:
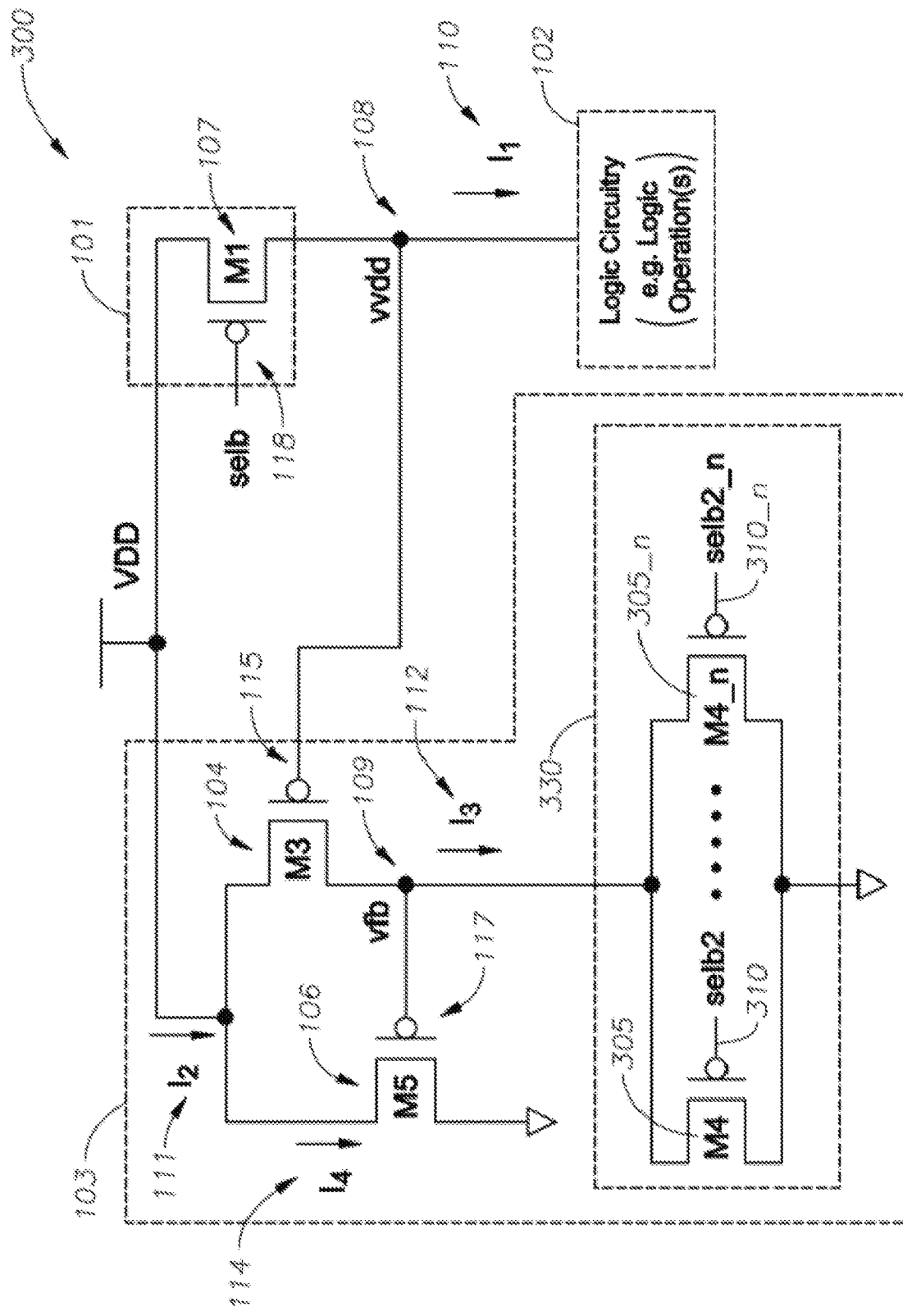
FIG. 3 is a circuit diagram schematically illustrating an apparatus for masking power consumption of a processor in accordance with yet another embodiment described herein.

Referring to FIG. 3, a circuit diagram schematically illustrating yet another design of an apparatus for masking the power consumption associated with logic circuitry of a processor is shown and generally designated 300. The apparatus 300 may be substantially similar to the apparatus 100 of FIG. 1 but may include and/or omit other components. For example, in contrast to the apparatus 100 of FIG. 1, the apparatus 300 may have a power-complementing circuitry 103 that includes a plurality of PMOS transistors 330. The plurality of PMOS transistors 330 may comprise a PMOS transistor 305 (e.g., the transistor M4) and "n" number of other PMOS transistors depicted as 305_$n$(e.g., an nth transistor M4_$n$), where "n" is a positive integer.

The plurality of PMOS transistors 330 may be connected in parallel to a first node 109 and to a second reference voltage supply (e.g., ground, or VSS). Each PMOS transistor (e.g., the transistor 305 up to and including the nth transistor 305_$n$) of the plurality of PMOS transistors 330 may have a gate terminal that is associated with a plurality of gate terminals (e.g., gate terminals 310 up to and including 310_$n$). The plurality of PMOS transistors 330 may be controlled by a plurality of second selection signals (e.g., the signals selb2 up to and including selb2_$n$). For example, each PMOS transistor (e.g., the transistor 305 up to and including the nth transistor 305_$n$) of the plurality of PMOS transistors 330 at its corresponding gate terminal of the plurality of gate terminals (e.g., gate terminals 310 up to and including 310_$n$) may be configured to receive a second selection bar signal (e.g., selb2 signal) that is associated with a plurality of second selection signals (e.g., the signals selb2 up to and including selb2_$n$) from a control circuitry (not shown). In a particular embodiment, the plurality of second selection signals may be associated with timing control of the plurality of PMOS transistors 330. This timing control may be independent of the control of the header circuitry 101. In a particular embodiment, the control circuitry associated with the apparatus 300 may be associated with other logic circuitry (e.g., multiplexer and/or demultiplexer circuitry).

The apparatus 300 may operate in a manner substantially similar to that of the apparatus 100 of FIG. 1 but may include and/or omit other operations. For example, the apparatus 300 may be configured to operate in a modulation mode associated with the processor. In a particular embodiment, during operation, the number of PMOS transistors to be active within the plurality of PMOS transistors 330 may depend upon the number of selb2 signals (e.g., the second selection signals selb2 up to and including selb2_$n$) activated. Activation of selb2 signals may be based on the number of operations to be executed by the logic circuitry 102.

In another embodiment, the activation of selb2 signals and the number of corresponding active PMOS transistors of the plurality of PMOS transistors 330 may be based on the current used (or power consumed) by the one or more operations to be executed by the logic circuitry 102. Accordingly, the activation (or de-activation) of individual PMOS transistors within the plurality of PMOS transistors 330 may more accurately modulate the power-complementing circuitry 103 for the provision of a second power consumption to power-complementing the power consumption associated with the operations/instructions executed by the logic circuitry 102. In this manner, the control of the plurality of PMOS transistors 330 by the plurality of second selection signals sent by a control circuitry may enable increased accuracy of the power-complementing circuitry 103 for complementing of a first power consumption associated with one or more operations of the logic circuitry 102. Such modulation may be of significant benefit when associated with operations/instructions that are part of a "pipelining" process of a processor.

As an illustrative example, the activation of one or more PMOS transistors of the plurality of PMOS transistors 330 may drain more current (e.g., the third current 112 ($I_3$)) and may modulate the voltage at the first node 109 (vfb) such that the first node 109 voltage is decreased. Similarly, the de-activation of one or more PMOS transistors of the plurality of PMOS transistors 330 may drain less current (e.g., the third current 112 ($I_3$)) and may increase the voltage at the first node 109 (vfb). In this manner, activated (or deactivated) transistors of the plurality of PMOS transistors 330 may more accurately modulate a fourth PMOS transistor 106 (e.g., M5) to enable more current (e.g., the case of more active M4 transistors) or less current (e.g., the case of fewer active M4 transistors) through the fourth PMOS transistor 106 (e.g., M5). Such modulation may provide a more accurate second power consumption by the power-complementing circuitry 103. Accordingly, for power consumption masking purposes, the power-complementing circuitry 103 may provide the second power consumption that is negatively correlated with a power consumption associated with logical operations performed by logic circuitry 102.

Figure 4:
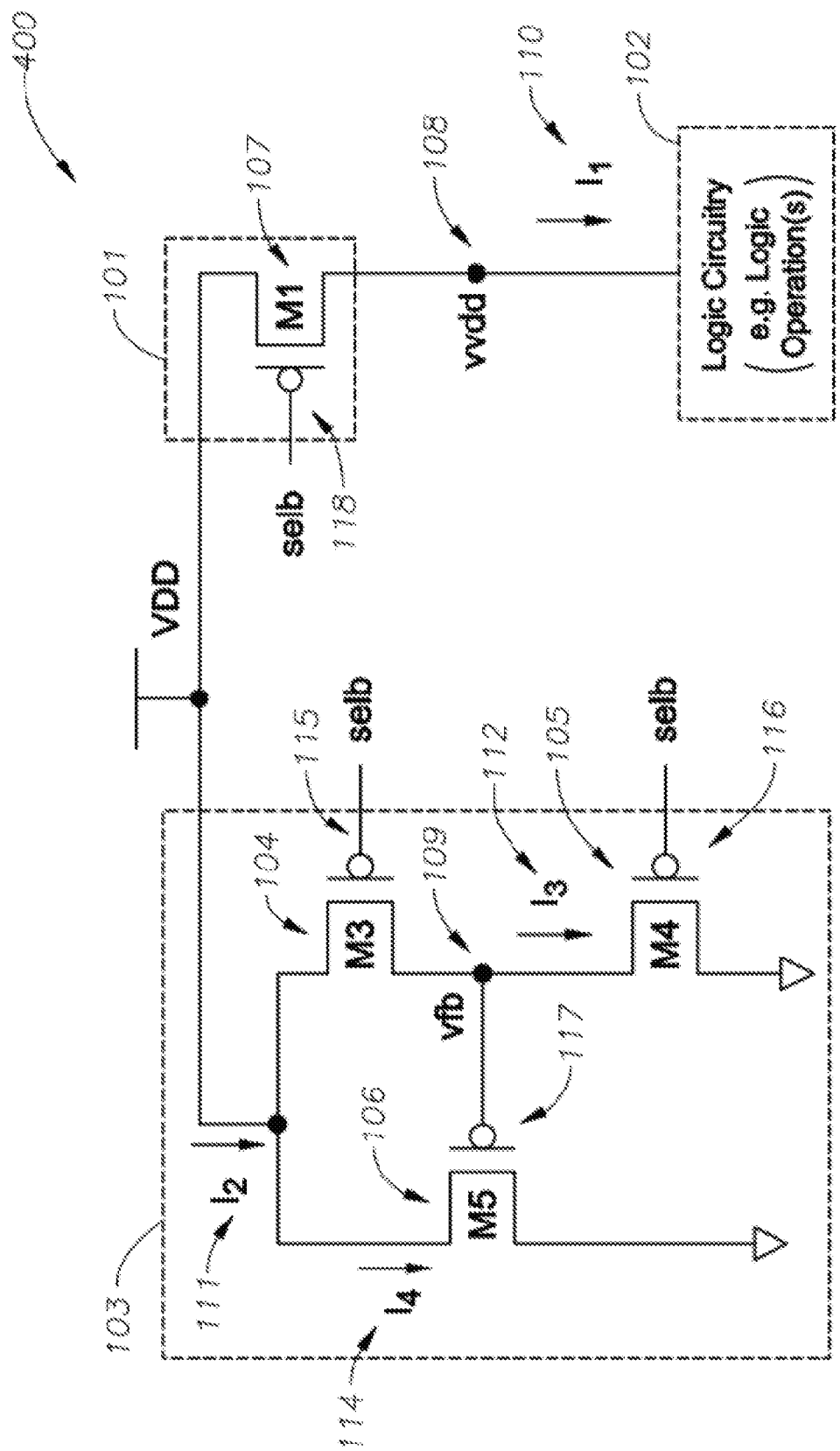
FIG. 4 is a circuit diagram schematically illustrating an apparatus for masking power consumption of a processor in accordance with yet another embodiment described herein.

Referring to FIG. 4, a circuit diagram schematically illustrating another design of an apparatus for masking the power consumption associated with logic circuitry of a processor is shown and generally designated 400. The apparatus 400 may be substantially similar to the apparatus 100 of FIG. 1 but may omit other components to enable operation in a similar but distinctive manner as that of the apparatus 100 of FIG. 1. For example, in contrast to the apparatus 100 of FIG. 1, the apparatus 400 may have a power-complementing circuitry 103 that is not connected to a logic circuitry 102 at a common node 108 (vvdd). The apparatus 400 may have a power-complementing circuitry 103 comprising a second PMOS transistor 104 (e.g., transistor M3), a third PMOS transistor 105 (e.g., transistor M4), and a fourth PMOS transistor 106 (e.g., transistor M5). A gate terminal 118 of a first PMOS transistor 107, a gate terminal 115 of the second PMOS transistor 104, and a gate terminal 116 of the third PMOS transistor 105 may be configured to receive a selb signal from control circuitry (not shown). The apparatus 400 may have header circuitry 101 configured to enable one or more operations of the logic circuitry 102. The header circuitry 101 and the power-complementing circuitry 103 may be configured to receive a selection signal (e.g., a selb signal, or other selection signal).

The apparatus 400 may include transistors having different threshold voltage values and different transistor sizes in a manner substantially similar to that of the apparatus 100 of FIG. 1. For example, the second PMOS transistor 104 and the fourth PMOS transistor 106 of the power-complementing circuitry 103 may be configured to have a "low" threshold voltage associated with the process technology. In another example, a size of the second PMOS transistor 104 and a size of the third PMOS transistor 105 may have a ratio of 5 to 1. In a particular embodiment, the second PMOS transistor 104 and the fourth PMOS transistor 106 may be sized to provide a second power consumption. To illustrate, the second PMOS transistor 104 and the fourth PMOS transistor 106 may be sized to enable the generation of a fourth current 114 (e.g., the current $I_4$) that may correspond to a current drain estimated for operations of the logic circuitry 102. In this manner, the power-complementing circuitry 103 of the apparatus 400 may be configured to provide a second power consumption to estimate a power consumption associated with the one or more operations of the logic circuitry 102. The second power consumption provided by the power-complementing circuitry 103 may complement the power consumption associated with the one or more operations of the logic circuitry 102.

Transistors of the apparatus 400 may be sized based on characteristics of the logic circuitry 102. For example, in a particular embodiment, the second PMOS transistor 104, the third PMOS transistor 105, and the fourth PMOS transistor 106 may be sized based on estimates (e.g., power consumption value estimates, predictions, and so forth) of a power consumption associated with one or more operations (or functional blocks) of the logic circuitry 102. In another embodiment, the second PMOS transistor 104 and the fourth PMOS transistor 106 may be sized based on design parameters of the functional blocks of the logic circuitry 102. In yet another embodiment, the second PMOS transistor 104 and the fourth PMOS transistor 106 may be sized based on predetermined power consumption values of the functional blocks of the logic circuitry 102. In another embodiment, the various sizes of the transistors of the apparatus 400 may be part of a standard cell library of a process technology. In a particular embodiment, the power consumption estimates may be accessed and stored locally from the processor associated with the logic circuitry 102. In another embodiment, the power consumption estimates may be accessed and stored from another device. In some embodiments, the access and storage of the power consumption estimates may be in the form of one or more look up tables associated with the processor or other device. In some embodiments, look up tables may be based, at least in part, on other computing operations that may be scaled upwards or downwards to arrive at a predicted estimate of the power consumption.

The transistors of the apparatus 400 may be configured to receive one or more selection signals form a control circuitry (not shown). The one or more selection signals may provide timing control of a second power consumption generated by the apparatus 400. To illustrate a particular embodiment, during operation, a gate terminal 118 of a first PMOS transistor 107 of the header circuitry 101, a gate terminal 115 of a second PMOS transistor 104, and a gate terminal 116 of a third PMOS transistor 105 of the power-complementing circuitry 103 may each receive a selection bar (selb) signal from the control circuitry. In another embodiment, the third PMOS transistor 105 may be controlled by a second selection bar (selb2) signal that is different from the selb signal. The selb2 signal may be associated with timing control of the third PMOS transistor 105 (e.g., control of power-complementing circuitry 103) that may be independent of the control of the header circuitry 101. In another embodiment, the selb2 signal may be associated with a plurality of PMOS transistors (e.g., which may include the third PMOS transistor 105) connected in parallel between the second PMOS transistor 104 and a second reference voltage supply (e.g., ground, or VSS). In another embodiment, the third PMOS transistor 105 may be controlled by a third selection bar (selb3) signal that may be different from the selb and/or the selb2 signals.

The apparatus 400 may operate in a manner substantially similar to but distinctive from the apparatus 100 of FIG. 1. For example, the apparatus 400 may be configured to provide a second power consumption to predictively complement the power consumption associated with logic circuitry while enabling control of the timing and activation of the predictive complementing. To illustrate a basic embodiment of the apparatus 400, during operation a gate terminal 118 of a first PMOS transistor 107 of the header circuitry 101, a gate terminal 115 of a second PMOS transistor 104, and a gate terminal 116 of a third PMOS transistor 105 of the power-complementing circuitry 103 may each receive a selection bar (selb) signal from control circuitry. The selb signal may have a logical value of 0 and a corresponding "low" voltage value (e.g., voltage value corresponding to ground, VSS, or low voltage source of a process technology). In receiving the selb signal, the first PMOS transistor 107, the second PMOS transistor 104, and the third PMOS transistor 105 may be substantially "on."

While the first PMOS transistor 107 is turned to an "on" state, the common node 108 may exhibit a voltage that corresponds to the operations of functional blocks of the logic circuitry 102. Additionally, a first current 110 may exhibit a current that also corresponds to the operations of the functional blocks of the logic circuitry 102. For example, for a given instance, as logic circuitry 102 operates multiple functional blocks to perform operations/instructions, the logic circuitry 102 may drain the first current 110 and exhibit a power consumption corresponding to the multiple functional blocks.

While the second PMOS transistor 104 and the third PMOS transistor 105 are on, a first node 109 (e.g., node vfb) may exhibit a voltage that may enable a fourth PMOS transistor 106 to conduct a relatively low current, which may bring about a decreased fourth current 114 (e.g., the current $I_4$) to be generated. In particular embodiments, the PMOS transistor 106 may operate to balance the current consumed by the logic circuitry 102. In certain embodiments, such current balancing may be achieved by keeping the voltage at the gate terminal 117 close to or at the linear or subthreshold operating region of the PMOS transistor 106 so that a small change in the voltage of the gate terminal 117 brings about a relatively large variation in current conduction of the PMOS transistor 106. In the embodiment of FIG. 4, when the voltage at the gate terminal 117 exceeds the threshold voltage of the PMOS transistor 106, the transistor 106 conducts a relatively large current. When the second PMOS transistor 104 and the fourth PMOS transistor 106 are sized corresponding to a current drain predicted for operations of the logic circuitry 102, the generated fourth current 114 may correspond to a second power consumption that can predictively complement the power consumption associated with operations of the logic circuitry 102. The second power consumption may complement the power consumption of the logic circuitry 102. In the case where the logic circuitry 102 may utilize fewer functional blocks for fewer performed operations/instructions, a second power consumption for predictive complementing may be provided by a power-complementing circuitry 103 comprised of a plurality of sub-complementing circuits, as further described with reference to FIG. 3 and/or FIGS. 5A/5B. In some embodiments, the use of sub-complementing circuits may permit greater power-complementing granularity by allowing the power-complementing circuitry to incrementally increase, or incrementally decrease, power consumption.

In a particular embodiment, the apparatus 400 may be configured to operate utilizing a third selection bar signal (selb3) having a voltage that varies based on the operations/instructions performed by the logic circuitry 102. In this manner, the apparatus 400 may provide a complementary power consumption that can predictively complement the power consumption associated one or more operations of a logic circuitry 102 of a processor. For example, control circuitry may provide the selb3 signal to the gate terminal 115 of the second PMOS transistor 104. The selb3 signal may have a voltage that varies based on the operations/instruction of a logic circuitry 102. In this manner, the selb3 signal may modulate the activity of the second PMOS transistor 104 to further modulate the activity of the fourth PMOS transistor 106 for the generation of a corresponding complementing of power consumption.

To illustrate, during a first case, the logic circuitry 102 may perform multiple operations/instructions having a corresponding power consumption. Based on the number or types of operations/instructions or based on the estimated power consumption associated with each operation/instruction, the selb3 signal may provide a voltage whose value decreases based on the logic circuitry 102 performing more operations/instructions (e.g., increases power consumption). The decreased selb3 voltage (based on increased logic operations) provided to the second PMOS transistor 104 may modulate the fourth PMOS transistor 106 to be less "on" so as to provide a smaller complementing power consumption for predictive complementing purposes.

Similarly, in a second case, the logic circuitry 102 may perform fewer operations/instructions having a corresponding lower power consumption. Based on the fewer numbers or types of operations/instructions or based on the lower estimated power consumption associated with the fewer operations/instructions, the selb3 signal may provide a voltage whose value increases based on the logic circuitry 102 performing fewer operations/instructions (e.g., decreases power consumption). The increased selb3 voltage (based on decreased logic operations) provided to the second PMOS transistor 104 may modulate the fourth PMOS transistor 106 to be more "on" so as to provide a larger complementing power consumption for predictive power-complementing purposes. In a particular embodiment, the second PMOS transistor 104 and the fourth PMOS transistor 106 may be sized based on a predicted maximum current drain for the logic circuitry 102 (e.g., a maximum power consumption associated with the logic circuitry 102) or may be based upon other conditions/parameters (e.g., power consumption estimates for one or more functional blocks of the logic circuitry 102). In this manner, the apparatus 400 may provide a power consumption to predictively complement the power consumption associated with operations/instructions of a logic circuitry 102.

The logic circuitry 102 may be associated with one or more functional blocks or logic operations/instructions. These operations may include, but are not limited to, any number of processor operations (e.g., data processing, arithmetic, and/or logical operations). In a particular embodiment, the logic operations may correspond to one or more pipeline steps carried out by the processor. In other embodiments, the logic operations may correspond to one or more stages of a cryptographic algorithm, one or more "keyed" cryptographic steps, or cryptographic algorithms associated with one or more encryption standards (e.g. AES, DES, or RSA standards).

The apparatus 400 may be configured to operate in other modes of operation as described herein, such as but not limited to the low-power mode described with reference to FIG. 2, any retention modes, or other modes of operation describe herein. Furthermore, the apparatus 400 (and its components) may be configured to enable control of timing and activation of the predictive complementing provided by the power-complementing circuitry 103. For example, by utilizing selection signals (e.g., selb, selb2 and/or selb3 signals), the apparatus 400 and its complementing circuitry 103 may be controlled so as to provide the second power consumption for power-complementing prior to or concurrently with performance of the operations/instruction of the logic circuitry 102. To illustrate a particular example, the logic circuitry 102 may perform operations/instructions associated with a "pipeline" process of a processor. Control circuitry associated with the apparatus 400 may determine operations/instructions of the pipeline that have yet to be performed and based on the determination may adjust the timing of selection signals sent to the apparatus 400 which may affect the timing of providing the second or complementary power consumption. In this way, the apparatus 400 may be configured to enable the control of timing and activation of the second power consumption for power-complementing (e.g., power consumption masking) the power consumption associated with the logic circuitry 102. Such control of the power-complementing provided by the apparatus 400, may improve processor performance during the masking of power consumption associated with encryption or non-encryption operations/instructions of logic circuitry.

To illustrate another example, the logic circuitry 102 of the apparatus 400 may perform operations/instructions associated with a "pipeline" process of a processor. Control circuitry associated with the apparatus 400 may determine operations/instructions of the pipeline process that have yet to be performed. Based on predicted power consumption values associated with the determine operations/instructions, a power consumption required for a next clock cycle of the pipeline process may be predicted. In a particular embodiment, the predictive power consumption values may be based on power consumption estimates for various processor operations/instructions. Accordingly, the apparatus 400 aware of the power consumption required for the next clock cycle, may provide a more timely and more accurate masking of power consumption. In this manner, the apparatus 400 may be configured to provide a faster masking power consumption with improved accuracy and timing to complement (e.g., power consumption masking) the power consumption associated with the logic circuitry 102.

Figure 5A:
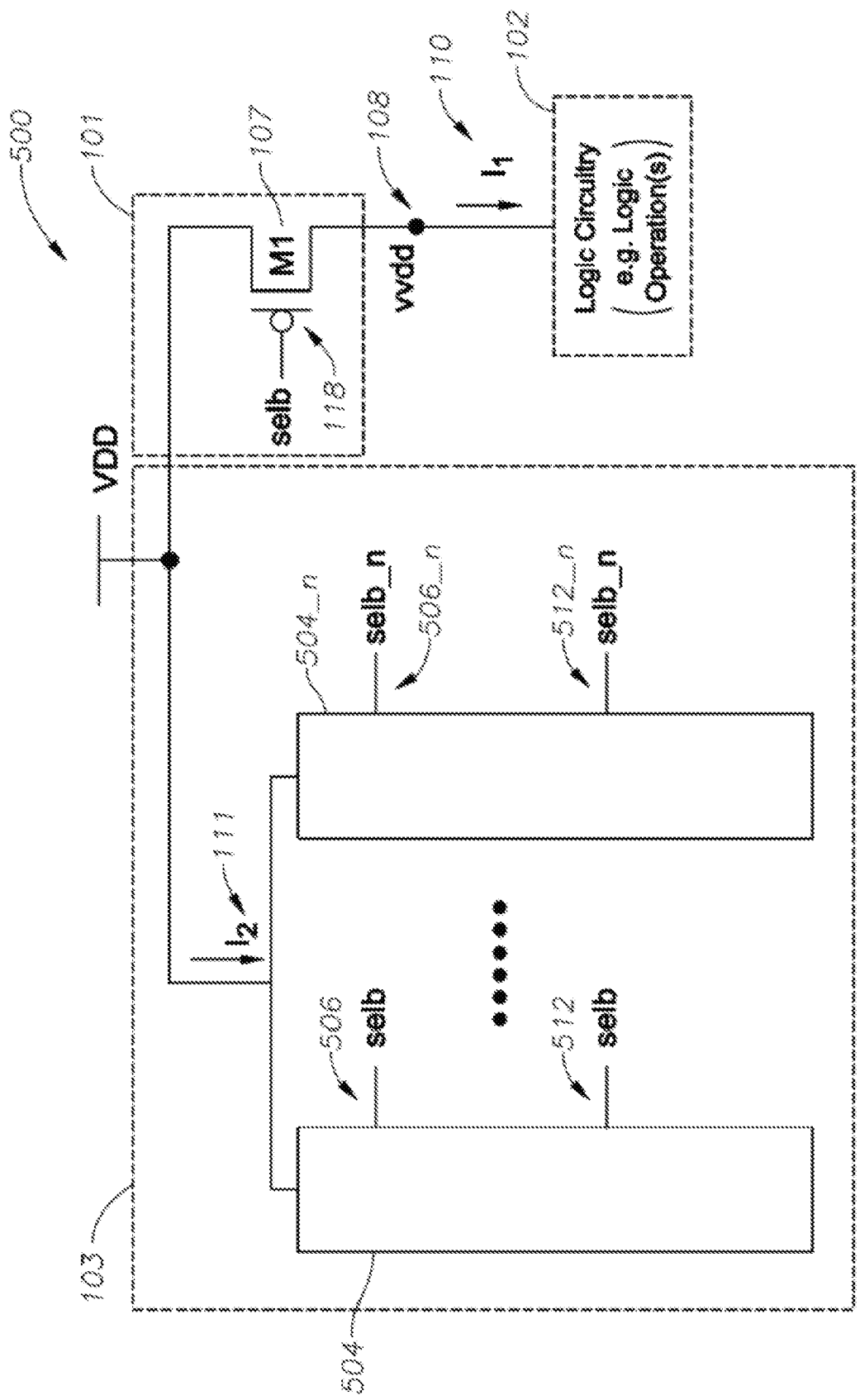
FIGS. 5A-5B are circuit diagrams schematically illustrating apparatuses for masking power consumption of a processor in accordance with other embodiments described herein.

Referring to FIG. 5A, a circuit diagram schematically illustrating another design of an apparatus for masking the power consumption associated with logic circuitry of a processor is shown and generally designated 500. The apparatus 500 may be substantially similar to the apparatus 100 of FIG. 1 and/or the apparatus 400 of FIG. 4 but may include and/or omit other components to enable operation in a similar manner as that of the apparatus 400 of FIG. 4. For example, the apparatus 500 may comprise power-complementing circuitry 103 that is not connected to a logic circuitry 102 at a common node 108 (vvdd). The power-complementing circuitry 103 may comprise a plurality of sub-complementing circuits that include the sub-power-complementing circuit 504 and "n" number of other sub-complementing circuits depicted as 504_n, where "n" is a positive integer.

The plurality of sub-complementing circuits (e.g., 504 up to and including 504_n) may be connected in parallel between a first reference voltage supply (e.g., VDD) and a second reference voltage supply (e.g., ground, or VSS). Each sub-complementing circuit of the plurality of sub-complementing circuits (504 to 504_n) may comprise the complementing circuitry 103 of FIG. 4. The plurality of sub-complementing circuits (e.g., 504 up to and including 504_n) may be configured to receive one or more selection signals (e.g., the selb signals: selb up to and including selb_n) from control circuitry (not shown). For example, the one or more selection signals may activate or de-activate one or more sub-complementing circuits of the plurality of sub-complementing circuits. To illustrate a particular example, the sub-complementing circuit 504 may receive the selb signal at gate terminals 506 and 512 (e.g., the gate terminals 115 and 116 of FIG. 4) corresponding to a second PMOS (e.g., PMOS 104) and a third PMOS transistor (e.g., PMOS 105). In a similar manner, other sub-complementing circuits 504_n may receive other selb signals (e.g., selb_n) at their respective gate terminals (e.g., gate terminals 506_n and 512_n) corresponding to their respective transistors (e.g., the second PMOS 104 and the third PMOS transistor 105).

The apparatus 500 may operate in ways substantially similar to that of the apparatus 400 of FIG. 4 but may include and/or omit other operations. For example, the apparatus 500 may provide a complementing power consumption to predictively mask a power consumption associated with one or more operations/instructions of the logic circuitry 102. To illustrate, the apparatus 500 may be configured to provide a second power consumption to predictively complement the power consumption associated with logical operations/instructions performed by logic circuitry 102. In a particular embodiment, the operations/instructions may be part of a "pipelining" process of a processor. In another embodiment, during operation, the number of sub-complementing circuits (e.g., 504 up to and including 504_n) to be active/de-active within the power-complementing circuitry 103 may depend upon the number of selb signals (e.g., selb up to and including selb_n) activated or de-activated. Activation/de-activation of selb signals may be based on the number of operations to be executed by the logic circuitry 102. In another embodiment, the activation/de-activation of selb signals and the number of corresponding active/de-active sub-complementing circuits (e.g., 504 up to and including 504_n) may be based on the current used (or power consumed) by the one or more operations to be executed by the logic circuitry 102. In these ways, the activation (or de-activation) of the plurality of sub-complementing circuits (e.g., 504 up to and including 504_n) may determine the second power consumption to be generated to complement the power consumption associated with the operations/instructions executed by the logic circuitry 102. In a particular embodiment, logical operations/instructions of a logic circuitry 102 may be determined and associated power consumption for a next clock cycle of the pipeline process may be predicted. Activation/de-activation of selb signals may be based on the predicted power consumption to enable the predictive masking of power consumption associated with the logic circuitry 102.

In particular embodiments, a power signature (which may include a unique magnitude for each operation performed by the logic circuitry 102) may additionally comprise a timing element. Accordingly, a power signature may be characterized as a waveform comprising multiple power peaks, as a function of time, within a single cycle. Thus, in addition to the blocks 504 through 504_n perhaps representing power consumption associated with operations and/or instructions executed by the logic circuitry 102, these blocks may also include circuitry that may mimic or copy the time versus power signature of operations performed by the logic circuitry 102. Such mimic circuitry is not designed to supply the entire magnitude of power throughout the cycle, but may bring about shaping of time-variant power peaks. Mimic circuitry, as may be implemented utilizing blocks 504 through 504_n, may include of sub-blocks (rather than entire blocks) of typical circuitry utilized to perform differing cryptographic functions. In some embodiments, such mimic circuits are not intended to fully imitate an unused block of circuitry in the logic circuitry 102. Rather, mimic circuits may assist in the formation of an appropriate constant time versus power signature. It should be noted that, at least in particular embodiments, mimic circuitry may not be intended to duplicate the logic circuitry 102 such that all functions are exercised in each cycle since such duplication may bring about a time versus power signature that may be unduly high in magnitude. Thus, at least in some embodiments, a purpose of mimic circuitry may be to create a low power maximum signature that includes the appropriate time components. The apparatus may combine multiple mimic circuits 504 . . . 504_n, aggregated with the time versus power signature of the logic circuitry 102, so as to maintain not only a constant amount or magnitude of power consumed, but, in addition, to form an accurate time versus power signature from cycle to cycle. Such time versus power signatures may give rise to timing peaks (higher power magnitude) occurring at the same times within each cycle. Using the selects (sel) signals at different timings as mentioned earlier may also contribute to a particular timed power signature.

The apparatuses of FIGS. 1-3 may demonstrate a reactive capability since a common node may be shared between node 108 (vvdd) in the current path of $I_1$ into the logic circuitry 102 and the at least one gate input to the power-complementing circuitry 103. This allows the complementing circuitry 103 to contribute more power when the logic circuitry 102 contributes less power, or vice versa. Power-complementing circuitry 103 may thus be capable of maintaining a constant total power consumption, which, in combination with appropriate timing of selects (sel) signals, may also enable a repeatable time versus power signature. However, as shown in FIGS. 4-5A, these apparatus do not share a common node between the circuitry 102 and 103. In some embodiments, an absence of a shared common node may give rise to a reduction in an ability for a reactive relationship to exist between the circuitry 102 and 103. In particular embodiments, this may be referred to as a complementary responsive power relationship rather than a reactive power relationship. However, in FIGS. 4-5A, the circuitry 103 may generate a complementary power through use of a predictive element in which a time versus power signature of the logic circuitry 102 may be predicted and in which the necessary remainder time power signature of the complementary circuit may be calculated and implemented through the circuitry 103. Although not explicitly shown, it is possible to combine into the elements of circuitry 103 the sub-circuits (which could be labeled 103a1 . . . 103an, for example) that share a common node with the logic circuitry 102, as well as other sub-circuits (which could be labeled 103b1 . . . 103bn, for example) that use a predictive time power signature, such that both techniques (reactive and predictive power complementing) may be combined to maintain a constant time versus power signature. In addition to having separate functions 103a1 . . . 103an (reactive) and 103b1 . . . 103bn (predictive) there may be a combination within a sub-component that allows a reactive portion of the current path to interact with a predictive portion of the current path within one sub-function. This might allow the reactive portion of the circuit to allow or restrict the total current in the sub-circuit while the predictive portion may supply the sensitivity to time.

To illustrate a non-limiting example, in the case where the logic circuitry 102 may utilize fewer functional blocks and/or perform fewer operations/instructions with an associated decreasing power consumption, control circuitry may predictively provide multiple selb signals (e.g., selb up to and including selb_n) to activate multiple corresponding sub-complementing circuits (e.g., 504 up to and including 504_n). The activation of multiple sub-complementing circuits may provide an increasing second power consumption for complementing the power consumption of the logic circuitry 102. In the case where the logic circuitry 102 may utilize more functional blocks and/or perform more operations/instructions with an associated increasing power consumption, the control circuitry may predictively provide fewer selb signals to activate fewer corresponding sub-complementing circuits (e.g., 504 up to and including 504_n). The activation of fewer sub-complementing circuits of the complementing circuit 103 may provide a decreasing second power consumption for complementing the power consumption of the logic circuitry 102. In this manner, the activation (or de-activation) of the plurality of sub-complementing circuits (e.g., 504 up to and including 504_n) may determine the second power consumption to be generated to predictively complement the power consumption associated with the operations/instructions executed by the logic circuitry 102. Accordingly, the second power consumption may complement the power consumption associated with the operations performed by logic circuitry 102.

In a manner similar to that of the apparatus 100 FIG. 1 and/or the apparatus 400 FIG. 4, the apparatus 500/501 may include transistors having different threshold voltage values and/or different transistor sizes. For example, the second PMOS transistor 104 and the fourth PMOS transistor 106 of one or more respective sub-complementing circuits may be sized based on power consumption estimates, design parameters, or predetermined power consumption values associated with one or more functional blocks of the logic circuitry 102. Power consumption estimates may be accessed and stored locally or remotely and may be associated with one or more a look up tables associated with the processor.

Additionally, the apparatus 500/501 may be configured to operate in other modes of operation as described herein, such as but not limited to, the low-power mode described with reference to FIG. 2, any retention modes, or other modes of operation describe herein. Furthermore, the apparatus 500/501 may be configured to enable control of timing and activation of the predictive power consumption complementing by utilizing selection signals (e.g., selb, selb2 and/or selb3 signals) in ways similar that described for the apparatus 400 of FIG. 4. Such control may enable the apparatus 500/501 to provide the complementing power consumption prior to or concurrently with performance of the operations/instruction of the logic circuitry 102 and in ways similar to that described for the apparatus 400 of FIG. 4. In a particular embodiment, control circuitry associated with the apparatus 500/501 may be associated with other logic circuitry (e.g., multiplexer and/or demultiplexer circuitry).

Figure 5B:
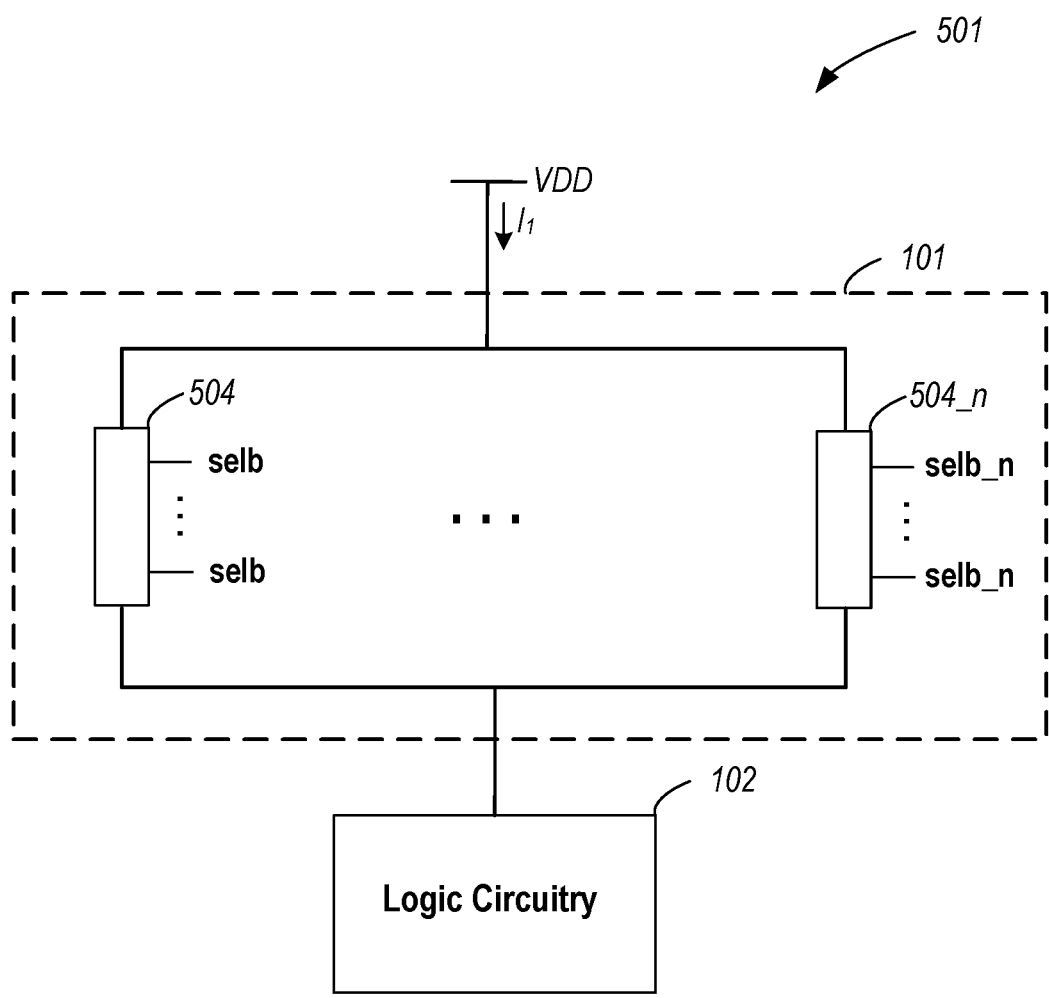

Referring to FIG. 5B, a circuit diagram schematically illustrating another design of an apparatus for masking the power consumption associated with logic circuitry of a processor is shown and designated as apparatus 501. The apparatus 501 may operate in ways substantially similar to that of FIG. 5A but may include and/or omit other operations. For example, the apparatus 501 may provide a power consumption limit to predictively mask a power consumption associated with one or more operations/instructions of the logic circuitry 102 by limiting the power consumed by each operation/instruction. To illustrate, the apparatus 501 may be configured to predictively use the header select lines selb through selb_n to provide additional legs (504 up to and including 504_n) of connection VDD to the logic circuitry 102. These connections operate to limit and/or control the power consumption associated with logical operations and/or instructions performed by logic circuitry 102. Such configuration effectively current limits or "current starves" logic circuitry 102, which slows the circuit operation but also masks the power consumption by spreading the current flow more uniformly over the clock cycle. In a particular embodiment, one header circuit (e.g., 504) would be activated to minimize the current/power used during a particular instruction/pipeline clock cycle. In another embodiment, header circuitry 101 comprises a group of header circuits (e.g., 504 up to and including 504_n), which, during operation, may be activated or rendered inactive in dependence on a number of selb signals (e.g., selb up to and including selb_n) that are activated or rendered inactive. Activation/de-activation of selb signals may be based, at least in part, on the number of operations to be executed by the logic circuitry 102. In another embodiment, activation/de-activation of selb signals and the number of corresponding active/de-active header circuits (e.g., 504 up to and including 504_n) may be based on the target current to be used (or power consumed) by the one or more operations to be executed by the logic circuitry 102. In these ways, the activation (or de-activation) of the plurality of header circuits (e.g., 504 up to and including 504_n) may obfuscate the power to be generated by the operations/instructions executed by the logic circuitry 102 by creating a substantially constant maximum power limit. That is to say, when logic circuitry 102 uses less power there would be little or no restriction, however as the power requirements of the circuitry increase, the plurality of header circuits would limit the power consumed to a substantially constant maximum. It is also to be noted that the activation (or de-activation) of the plurality of header circuits (e.g., 504 up to and including 504_n) may be determined predictively via software or set through a structure such as a linear feedback shift register to mask the power consumption of logic circuitry 102.

Figure 6:
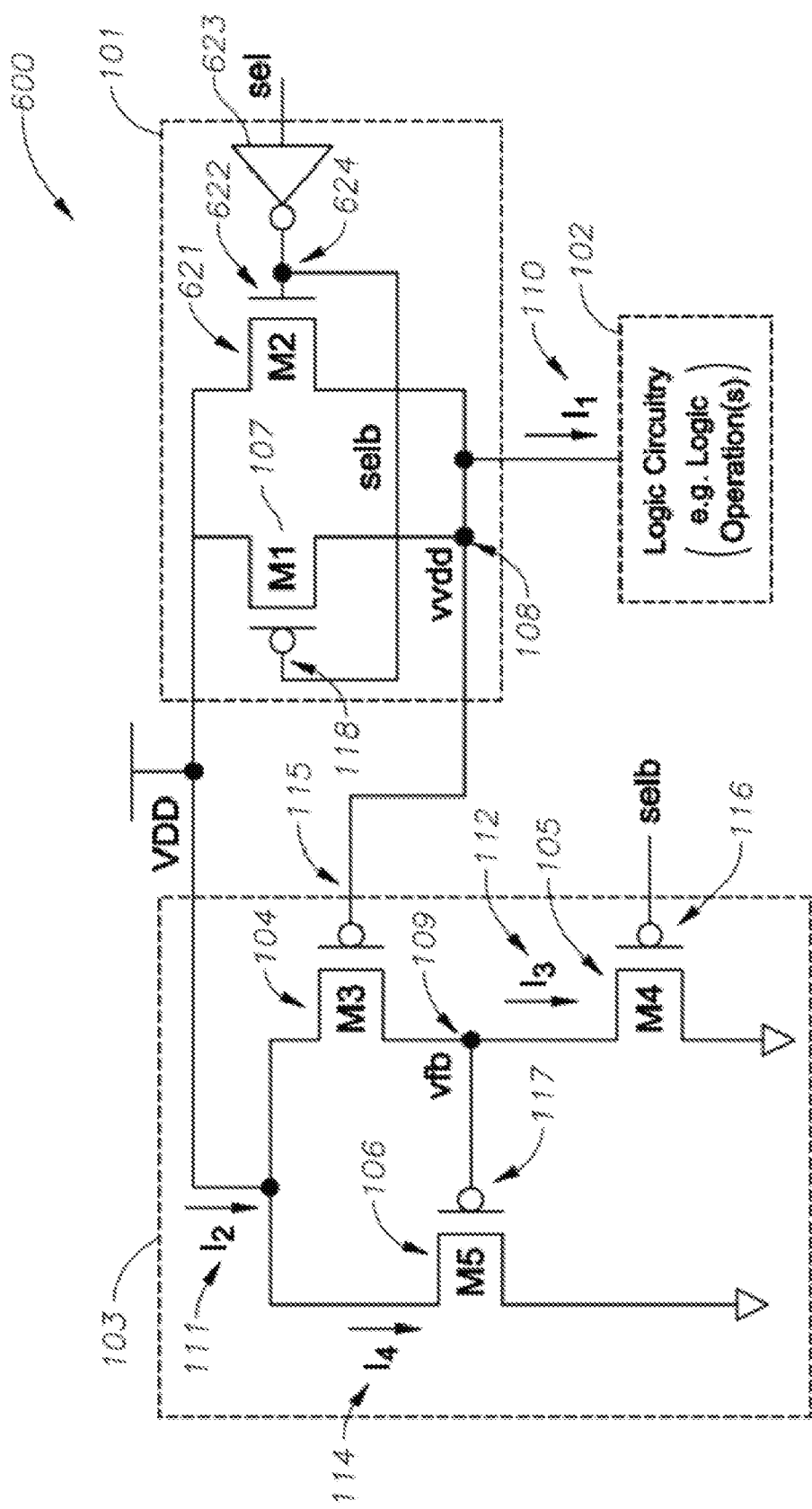
FIG. 6 is a circuit diagram schematically illustrating an apparatus for masking power consumption of a processor in accordance with yet another embodiment described herein.

Referring to FIG. 6, a circuit diagram schematically illustrating another design of an apparatus for masking the power consumption associated with logic circuitry of a processor is shown and generally designated 600. The apparatus 600 may be substantially similar to the apparatus 100 of FIG. 1 but may include and/or omit other components. For example, in contrast to the apparatus 100 of FIG. 1, the apparatus 600 may include a header circuitry 101 that includes an NMOS transistor 621 (e.g., transistor M2) and an inverter 623. The NMOS transistor 621 may be connected in parallel with a first PMOS transistor 107 (e.g., transistor M1) to a first reference voltage supply (e.g., VDD) and to the logic circuitry 102 via the common node 108 (vvdd). The NMOS transistor 621 may have a gate terminal 622 connected to a gate terminal 118 of the first PMOS transistor 107 at the node 624, shown as connected to the gate terminal 622. The inverter 623 may be connected to the node 624 and may be configured to receive, as an input, a selection (sel) signal from control circuitry (not shown). The inverter 623 may provide a selection bar (selb) signal at the node 624. The selb signal may be an inverse signal of the sel signal. The NMOS transistor 621 and the first PMOS transistor 107 may be configured to receive the selb signal at their respective gate terminals (e.g., the node 624 and the gate terminal 118, respectively).

The apparatus 600 may operate in a manner substantially similar to that of the apparatus 100 of FIG. 1 but may include and/or omit other operations. For example, the apparatus 600 may be configured to operate in a retention mode associated with the processor. To illustrate a particular embodiment, during operation, a gate terminal 116 of a third PMOS transistor 105 of the complement circuitry 103 may receive the selb signal from control circuitry (not shown). The gate terminal 118 of the first PMOS transistor 107 and the gate terminal 622 of the NMOS transistor 621 may both receive the selb signal via the node 624. The selb signal may provide a logical value of 1 (e.g., a corresponding "high" voltage value such VDD voltage, a voltage greater than a threshold voltage, etc.) to the transistors 105, 107, and 621 to enable the transistors 105 and 107 to be substantially "off" and to enable the transistor 621 to be substantially "on". In another embodiment, the third PMOS transistor 105 may be controlled by a second selection bar (selb2) signal that is different from the selb signal. The selb2 signal may be associated with timing control of the third PMOS transistor 105 that may be independent of the control of the header circuitry 101.

For the case utilizing the selb signal, in contrast to the apparatus 100 of FIG. 1, the active NMOS transistor 621 may enable the common node 108 (vvdd) to have a voltage sufficient for particular components of the logic circuitry to maintain a logic state. To illustrate, for one or more instances, the logic circuitry 102 may not require masking of its power consumption (e.g., a non-DPA mode of the processor) but the logic circuitry 102 may include components (e.g., storage/memory components) that require a voltage for maintaining/retaining a logic state. The active NMOS transistor 621 of the header circuitry 101 may enable a voltage at the common node 108 for such retention purposes. In this manner, a retention mode for the logic circuitry 102 may be provided. Accordingly, although the obscuring of the power consumption of the logic circuitry 102 may be unnecessary (e.g., a non-DPA mode of the processor) with a corresponding inactive power-complementing circuitry 103 (e.g., no masking performed), logic state components (e.g., storage/memory components) of the logic circuitry 102 may maintain their logic states during the retention mode provided by the apparatus 600.

In a particular embodiment, the retention mode of the apparatus 600 may be part of a "sleep" mode of operation associated with the logic circuitry 102 or associated processor. In another embodiment, the retention mode of the apparatus 600 may enable faster "wake-up" times for the logic circuitry 102 and associated processor. For example, by providing a voltage (e.g., at the common node 108)

sufficient to maintain a logic state for particular components of the logic circuitry 102 (i.e., the retention mode of the apparatus 600), logic circuitry components (e.g., storage/memory units) may have a voltage nearer to a "wake-up" (e.g., active) voltage. Accordingly, the retention mode of the apparatus 600 may enable the logic circuitry components to reach a "wake-up" (e.g., active) voltage in less time.

Figure 7:
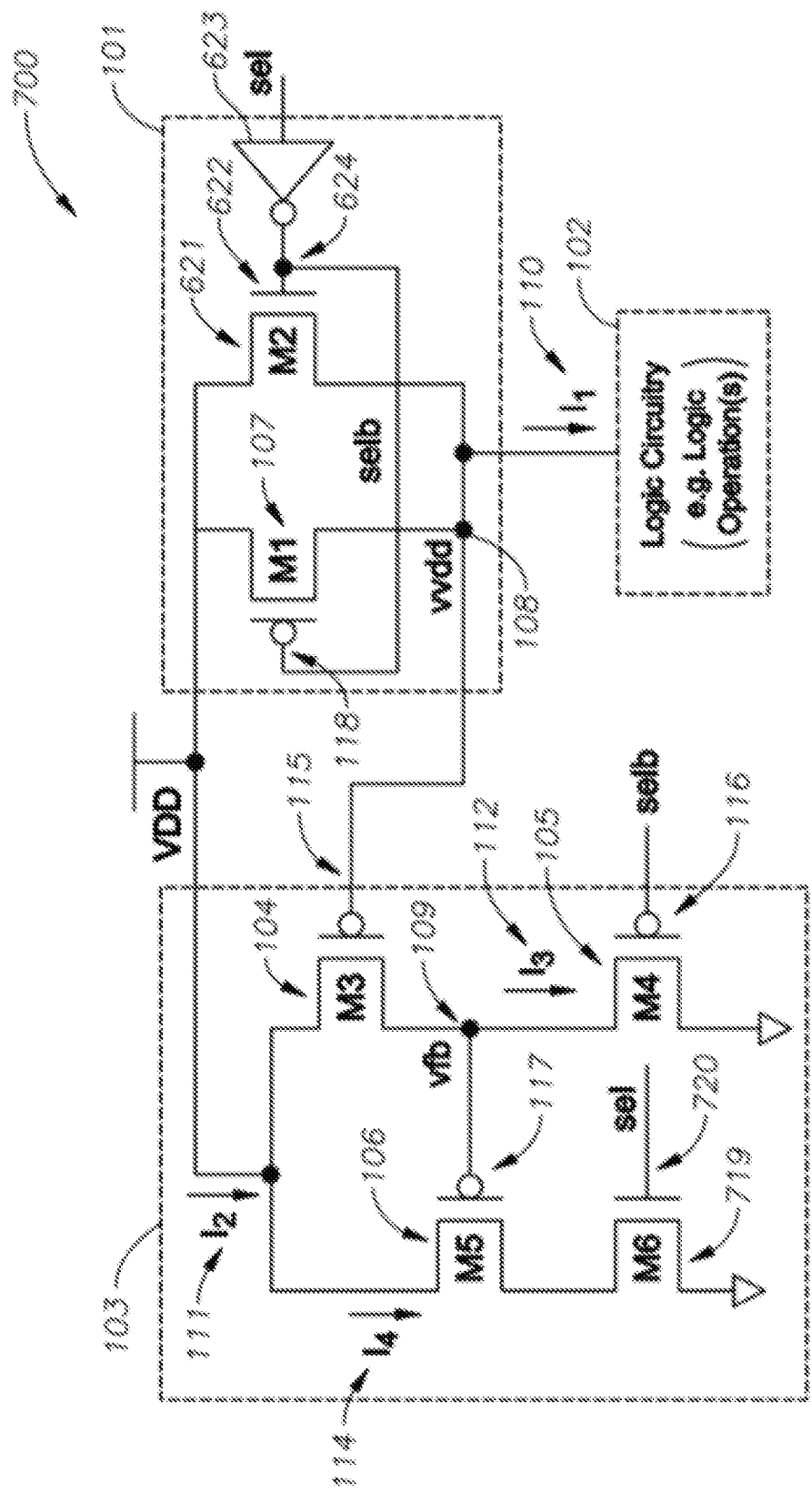
FIG. 7 is a circuit diagram schematically illustrating an apparatus for masking power consumption of a processor in accordance with yet another embodiment described herein.

Referring to FIG. 7, a circuit diagram schematically illustrating another design of an apparatus for masking the power consumption associated with logic circuitry of a processor is shown and generally designated 700. The apparatus 700 may be substantially similar to the apparatus 100 of FIG. 1, the apparatus 200 of FIG. 2 and/or the apparatus 600 of FIG. 6 but may include and/or omit other components. For example, in contrast to the apparatus 600 of FIG. 6, the apparatus 700 may have a power-complementing circuitry 103 that includes a second NMOS transistor 719 (e.g., transistor M6). The second NMOS transistor 719 may be connected to a fourth PMOS transistor 106 (e.g., transistor M5) of the power-complementing circuitry 103 and may be connected to a second reference voltage supply (e.g., ground, or VSS). The second NMOS transistor 719 may have a gate terminal 720 configured receive a selection (sel) signal from control circuitry (not shown).

The apparatus 700 may operate in a manner substantially similar to the apparatus 200 of FIG. 2 and/or the apparatus 600 of FIG. 6. For example, in contrast to the apparatus 600 of FIG. 6, the apparatus 700 may be configured to operate in a retention mode, but may also be configured to operate in a low-power mode associated with the processor, in a similar manner as the low-power mode of the apparatus 200 of FIG. 2. To illustrate a particular embodiment, during operation, a gate terminal 118 of the first PMOS transistor 107 and the gate terminal 622 of the first NMOS transistor 621 may both receive the selb signal via the node 624. A gate terminal 116 of a third PMOS transistor 105 of the power-complementing circuitry 103 may receive the selb signal from control circuitry (not shown). In a particular embodiment, the third PMOS transistor 105 may be controlled by a second selection bar (selb2) signal that is different from the selb signal. The selb2 signal may be associated with timing control of the third PMOS transistor 105 that may be independent of the control of the header circuitry 101.

The selb signal may be an inverse signal of a selection (sel) signal and may provide a logical value of 1 (e.g., a corresponding "high" voltage value such VDD voltage, a voltage greater than a threshold voltage, etc.) to the transistors 105, 107, and 621. Accordingly, the first PMOS transistor 107, and the third PMOS transistor 105 may each be substantially "off" while the first NMOS transistor 621 may be substantially "on." In this way, the apparatus 700 may provide a retention mode for the logic circuitry 102 that operates in a manner similar to the retention mode of the apparatus 600 of FIG. 6.

The second NMOS transistor 719 may have a gate terminal 720 configured receive the sel signal from the control circuitry. In another embodiment, the second NMOS transistor 719 may be controlled by a second selection bar (selb2) signal that is different from the sel signal. The sel signal may provide a logical value of 0 corresponding "low" voltage value (e.g., a voltage value corresponding to ground, VSS, or low voltage source of a process technology) to the gate terminal 720 of the first NMOS transistor 219. Accordingly, the second NMOS transistor 719 may be substantially "off." In this case, having the second NMOS transistor 719 in an "off" state may prevent the fourth PMOS transistor 106 from leaking current to a ground terminal. In this manner, less power is consumed by the power-complementing circuitry 103 which may correspond to the apparatus 700 operating in a low-power mode associated with the processor.

Accordingly, the apparatus 700 may provide for the masking of the power consumption associated with the logic circuitry 102, may also provide a retention mode operation for the logic circuitry 102, and may also provide a means for preventing current leakage with the use of a low-power mode associated with the logic circuitry 102 and associated processor. The low-power mode may be associated with instances where logic operations are not performed and/or undesired monitoring/analysis of the processor is not a concern (e.g., a non-DPA mode of operation). The retention mode may be part of a "sleep" mode of operation associated with the logic circuitry 102 or associated processor.

Figure 8A:
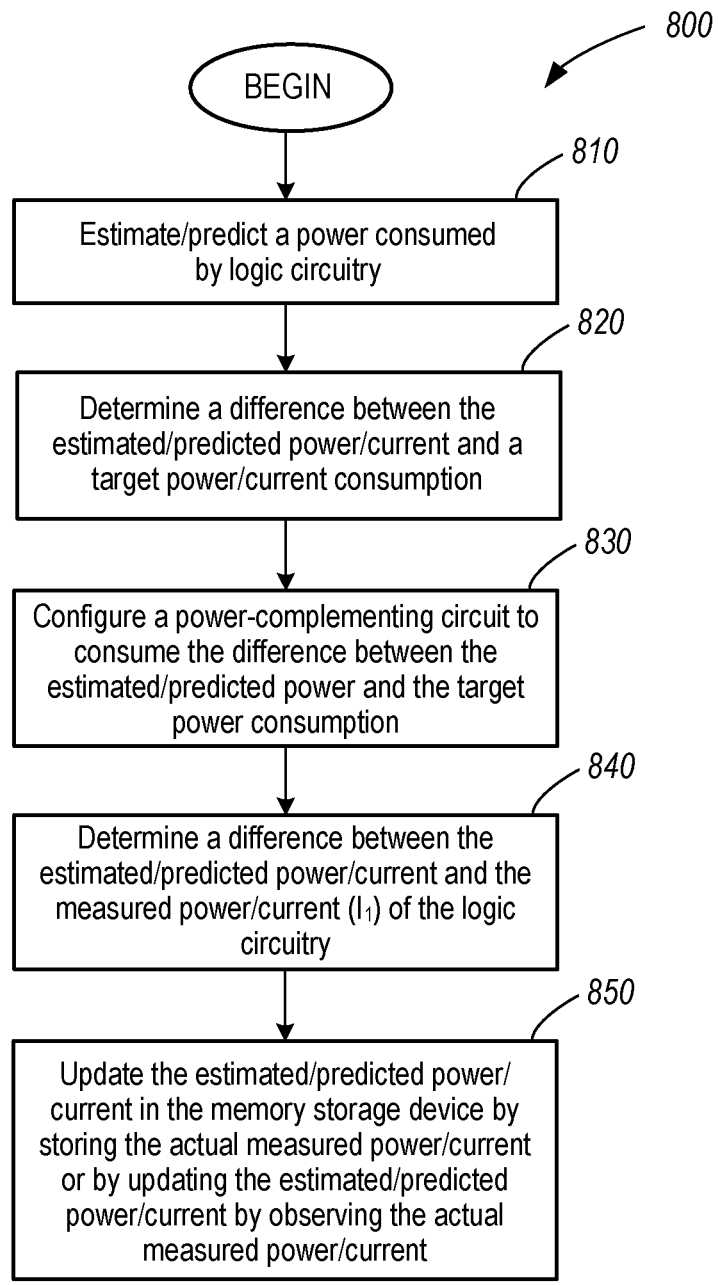
FIGS. 8A, 8B, and 8C are flow charts that illustrate methods for masking power consumption associated with logic circuitry of a processor in accordance with other embodiments described herein.

FIG. 8A is a flow chart that illustrates an embodiment of a method for masking power consumption associated with one or more operations of a logic circuitry of a processor is shown and generally designated 800. The method 800 includes 810, which may include estimating or predicting a power consumed by logic circuitry, such as the logic circuitry 102 of FIG. 1. In one example, power consumption of operations performed by the logic circuitry 102 may be estimated or predicted in response to accessing a storage device, such as a memory storage device 950 of FIG. 9. In an embodiment, memory storage device 950 may comprise a lookup table, which may include one or more power consumption values associated with a corresponding operation conducted by the logic circuitry 102. In another embodiment, access of memory storage device 950 may result in a processor, such as processor 930 of FIG. 9, performing an algorithm or other type of computer-implemented method, which may be utilized to derive one or more power consumption values associated with a logic operation performed by the logic circuitry 102.

Figure 9:
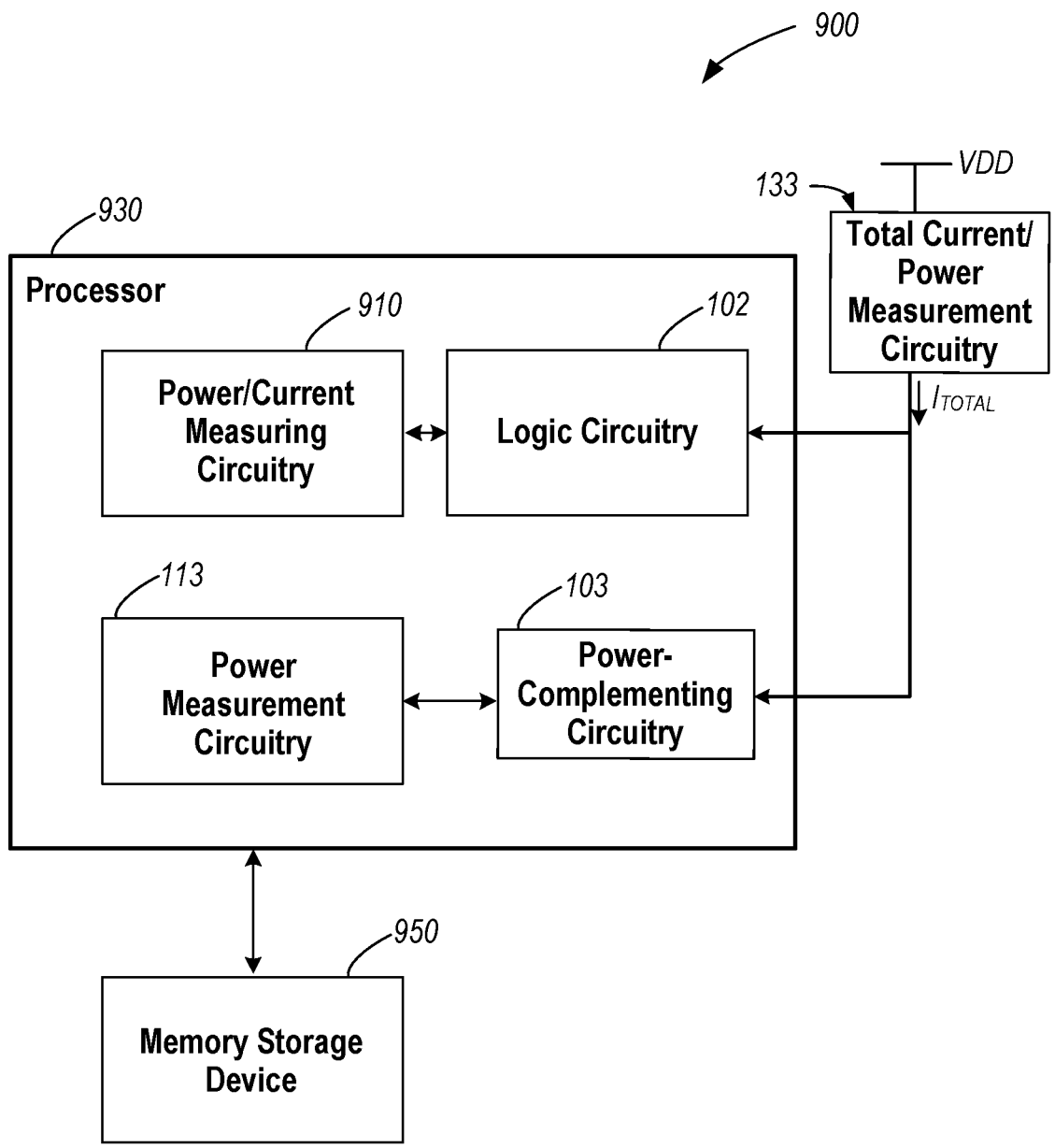
FIG. 9 is a block diagram schematically illustrating an apparatus for masking power consumption of a processor in accordance with yet another embodiment described herein.

In response to an estimation or prediction of a power consumed by the logic circuitry 102, a processor, such as processor 930 of FIG. 9, may determine a difference between the estimated/predicted power consumption values associated with an operation to be conducted by the logic circuitry 102, such as at 820, and the target power/current consumption. In one example, in response to estimating/predicting that a logic operation is likely to consume 0.25 mA, a processor may determine that 0.75 mA is to be generated by power-complementing circuitry so as to bring about a target power consumption of 1.0 mA. Accordingly, such as at 830, power-complementing circuitry may be configured to consume the difference between the estimated/predicted power and the target power consumption. 830 may involve providing, for example, an selb signal, which may operate to give rise to current conduction through one or more PMOS transistors of the power-complementing circuitry 103.

Some embodiments may additionally include 840, which may involve determining a difference between the estimated or predicted power/current and the measured power/current ($I_1$) of the logic circuitry. Some embodiments may additionally include 850, which may involve updating the predicted or estimated or predicted power/current in a memory storage device by storing the actual measured power/current or by updating the predicted power/current by observing the actual measured power/current.

In one embodiment, estimation or prediction of a power consumed by the logic circuitry 102 may involve clock-cycle-by-clock-cycle estimation/prediction. Accordingly, in one example, during one or more initial clock cycles of a cryptographic security operation, the logic circuitry 102 may consume relatively low power as coefficients are accessed from, for example, solid-state memory devices. As accessed coefficients are loaded into program memory, power consumption may increase, such as in response to a binary arithmetic operations being conducted by a processor, such as processor 930 of FIG. 9. After such computations are completed, power consumption by the logic circuitry 102 may return to a relatively low level as results of cryptographic processing are loaded into solid-state memory devices. Accordingly, during various processing phases of the cryptographic security operation, complementary power consumption, such as by power-complementing circuitry 103, may be controlled, such as by way of an selb signal. Thus, throughout the various clock cycles during which the cryptographic security operation is being performed, the combined power consumed by the logic circuitry 102 and the power-complementing circuitry 103 may be maintained at a substantially constant value.

In some embodiments, the power-complementing circuitry 103 may operate to counterbalance power and/or current consumed by the logic circuitry 102. In particular embodiments, the power-complementing circuitry 103 may enable the generation of a current and corresponding power consumption (e.g., a second power consumption) that varies in a complementary manner with the power consumption (e.g., a first power consumption) associated with the one or more logic operations performed by the logic circuitry 102. For example, given a maximum current designed for the apparatus 100, the logic circuitry 102 may perform one or more logic operations (and/or associated instructions) utilizing one or more functional blocks which may drain, for example, two thirds of the maximum current and exhibit a corresponding two thirds power consumption of the maximum power consumption. In this case, the power-complementing circuitry 103 may enable the generation of a current that is one third of the maximum current and the power-complementing circuitry 103 may exhibit a corresponding one third power consumption of the maximum power consumption. In this manner, the power-complementing circuitry 103 may provide a counterbalancing power consumption that varies in a complementary manner with the power consumption associated with the one or more logic operations performed by the logic circuitry 102.

The power-complementing circuitry 103, which may operate to counterbalance the power consumed by the logic circuitry 102 may enable the generation of the second current 111 (e.g., the current $I_2$) that may be comprised of the third current 112 (e.g., the current $I_3$) and the fourth current 114 (e.g., the current $I_4$). In a particular embodiment, the fourth current 114 may have a value that is substantially greater than a value for the third current 112. The second current 111 (e.g., $I_2$) and the first current 110 (e.g., $I_1$) may have the following relationships:

$$I_2 \propto 1/I_1$$

$$I_{total} \approx I_1 + I_2$$

where $I_{total}$ is the maximum current for the apparatus 100.

In a similar manner, if the logic circuitry 102 performs one or more logic operations (and/or associated instructions) utilizing one or more functional blocks to drain, (e.g., one fourth of the maximum current and exhibit a corresponding one fourth possible power consumption.) In this case, the power-complementing circuitry 103 may enable the generation of a current that is three fourths of the maximum current and the power-complementing circuitry 103 may exhibit a corresponding three fourths possible power consumption. In this manner, the power-complementing circuitry 103 may provide counterbalancing power consumption that varies inversely with the power consumption associated with the one or more logic operations performed by the logic circuitry 102. It is to be understood that other power consumption values exhibited by the logic circuitry may be counterbalanced by the power-complementing circuitry 103 in the manner described herein.

As another illustration, if the power consumption of the logic circuitry 102 is half the maximum power consumption available to the apparatus 100, the power-complementing circuitry 103 may provide for a second power consumption that is half the maximum power consumption available to the apparatus 100. Similarly, if the power consumption of the logic circuitry 102 is three fourths the maximum power consumption available to the apparatus 100, the power-complementing circuitry 103 may provide for a second power consumption that is one fourth the maximum power consumption available to the apparatus 100. In this manner, the power-complementing circuitry 103 may provide for a second power consumption that varies inversely with a power consumption associated with logical operations performed by logic circuitry 102 of a processor. It is to be understood that the power-complementing circuitry 103 is not limited to the operational examples described herein, but may also provide other inverse values of power consumption within a range of a maximum power consumption available to the apparatus 100.

Figure 8B:
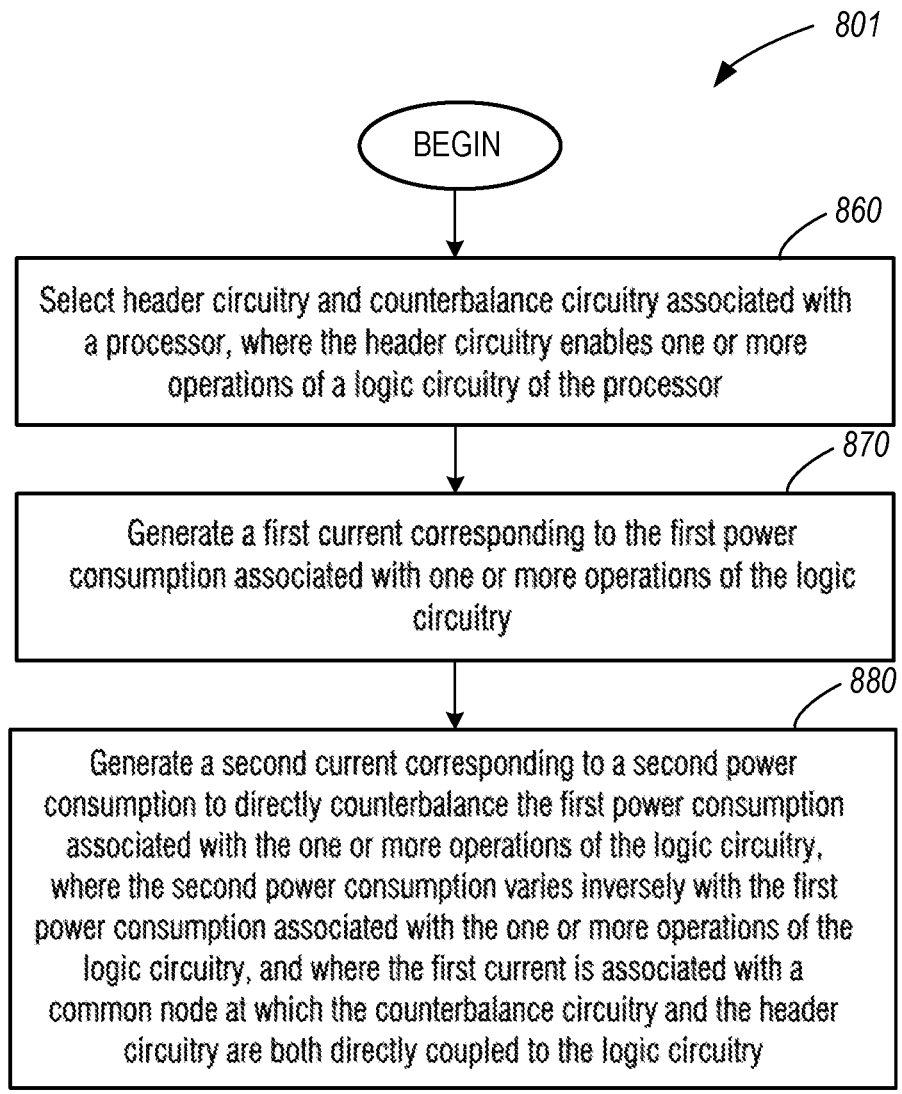

In accordance with embodiments for which power-complementing circuitry 103 operates to counterbalance power consumption of the logic circuitry 102, FIG. 8B is a flow chart that illustrates a method for masking power consumption associated with logic circuitry. The method 801 includes 860, which may comprise estimating a power consumed by logic circuitry, such as the logic circuitry 102 of FIG. 1, for example. In one example, power consumption of operations performed by the logic circuitry 102 may be estimated in response to accessing a storage device, such as a memory storage device 950 of FIG. 9. In an embodiment, memory storage device 950 may comprise a lookup table, which may include one or more power consumption values associated with a corresponding operation conducted by the logic circuitry 102. In another embodiment, access of memory storage device 950 may result in a processor, such as processor 930 of FIG. 9, performing an algorithm or other type of computer-implemented method, which may be utilized to derive one or more power consumption values associated with a logic operation performed by the logic circuitry 102. The method of FIG. 8B further includes generating a first current corresponding to the power consumption (e.g., a first power consumption) associated with the one or more operations of the logic circuitry, at 870. For example, the header circuitry may receive a selb signal having logical value of 0 that corresponds to a "low" voltage value (e.g., a ground, VSS, or low voltage value) that may be part of activating the header circuitry (e.g., header circuitry 101) to be substantially "on." Such activation of the header circuitry may enable the generation of a first current (e.g., the current 110 of the apparatuses described herein) that corresponds to the operation of one or more functional blocks of a logic circuitry (e.g., the logic circuitry 102 of the apparatuses described herein).

The method 801 also includes generating a second current corresponding to a second power consumption to directly counterbalance the power consumption associated with the one or more operations of the logic circuitry, where the second power consumption varies inversely with the power consumption associated with the one or more operations of the logic circuitry, and where the first current is associated with a common node at which the counterbalance circuitry and the header circuitry are both coupled to the logic circuitry, at 880. For example, a counterbalance circuitry (e.g., the power-complementing circuitry 103 of the apparatuses described herein) may receive a selb signal having logical value of 0 that corresponds to a "low" voltage value (e.g., a ground, VSS, or low voltage value) that may be part of activating the power-complementing circuitry. Such activation of the power-complementing circuitry to counterbalance power consumption of the logic circuitry 102 may enable the generation of a second current (e.g., the current 114 of the apparatuses described herein) that corresponds to a second power consumption. The generated second power consumption may be used to directly counterbalance the power consumption associated with the operation of one or more functional blocks of a logic circuitry (e.g., the logic circuitry 102 of the apparatuses described herein).

The second power consumption generated by the method 801 may vary inversely with the power consumption associated with the one or more operations of the logic circuitry. For example, in a non-limiting example, if the logic circuitry performs one or more logical operations that corresponds to a power consumption that is, for example, one fourth the maximum power consumption available, the counterbalance circuitry may provide a second power consumption (via an associated current drain) that may be three fourths the maximum power consumption available. In this manner, the counterbalance circuitry may provide a second power consumption that varies inversely with a power consumption associated with logical operations performed by the logic circuitry. It is to be understood that the counterbalance circuitry may also provide other inverse values of power consumption within a range of a maximum power consumption that is available.

The first current may be associated with a common node at which the counterbalance circuitry and the header circuitry are both coupled to the logic circuitry. For example, the first current generated by the header circuitry may be part of a common node (e.g., the common node 108 (vvdd) of the apparatuses described herein). This common node may be a node at which the counterbalance circuitry and the header circuitry (e.g., the power-complementing circuitry 103, the header circuitry 101 of the apparatuses described herein) are both connected to the logic circuitry (e.g., the logic circuitry 102 of the apparatuses described herein). Such a connection between the counterbalance circuitry and the logic circuitry may provide for a more accurate counterbalancing of the power consumption associated with one or more operations of the logic circuitry.

The methods 800, 801, and 802 may incorporate the operations and characteristics described for the apparatuses 100, 200, 300, 600, and/or 700 of FIGS. 1, 2, 3, 6, and 7, respectively. For example, transistors (e.g., the second PMOS transistor 104 and the fourth PMOS transistor 106) of the power-complementing circuitry 103 may be sized based on different factors to enable generation of a second power consumption to counterbalance the power consumption associated with operations of a logic circuitry 102. In a non-limiting example, transistors of the power-complementing circuitry 103 may be sized based on power consumption estimates for one or more functional blocks of the logic circuitry 102. Alternatively or in addition, transistors may be configured to have different threshold voltage values. The methods 800, 801, and 802 may incorporate the various modes of operation of the apparatuses described herein such as, but not limited to, a secure mode, low-power mode, retention mode, or other modes of operation of a processor.

Figure 8C:
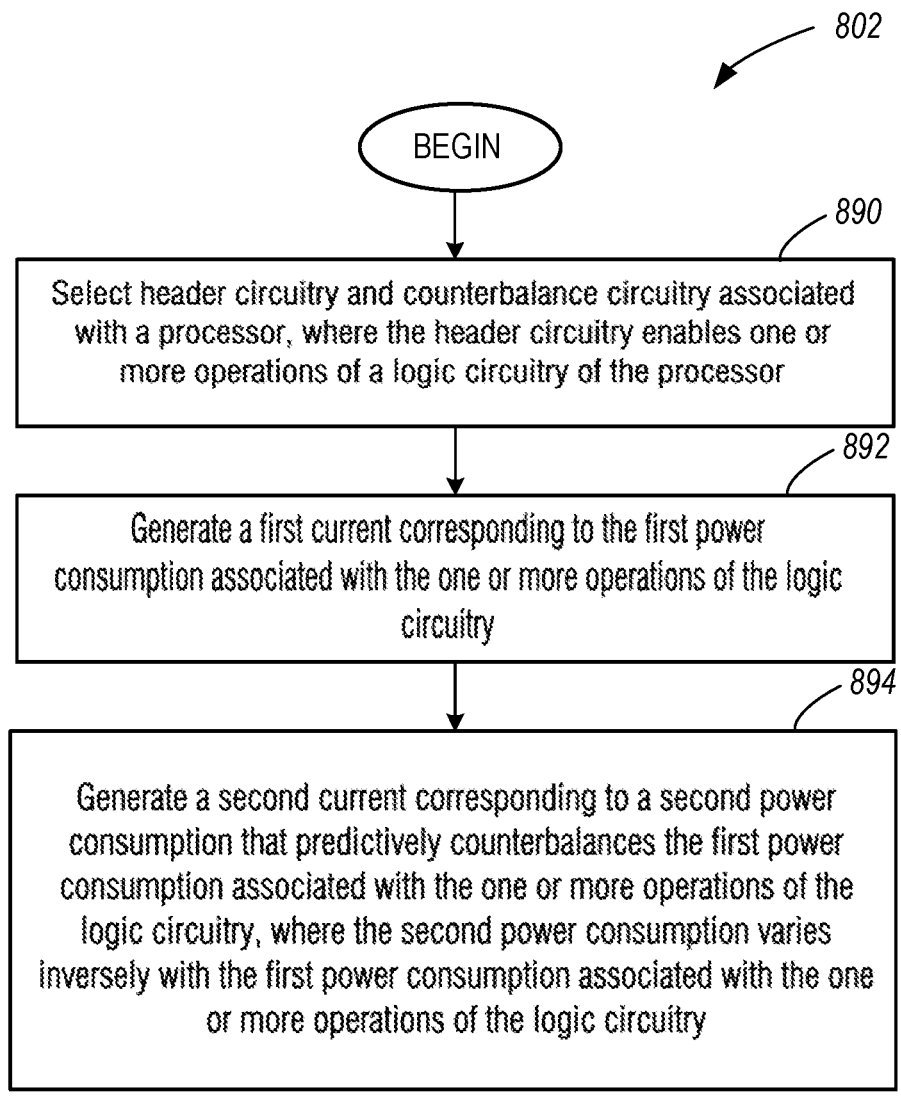

In accordance with embodiments for which power-complementing circuitry 103 operates to counterbalance power consumption of the logic circuitry 102, FIG. 8C is a flow chart that illustrates a method for masking power consumption associated with logic circuitry. Referring to FIG. 8C, a flow chart that illustrates a particular embodiment of a method for masking power consumption associated with one or more operations of a logic circuitry of a processor is shown and generally designated 802. The method 802 includes selecting header circuitry and counterbalance circuitry associated with the processor at 890. For example, control circuitry may provide selection signals (e.g., selb, selb2, and/or selb3 signals) to header circuitry and counterbalance circuitry (e.g., header circuitry 101 and power-complementing circuitry 103) of an apparatus (e.g., such as the apparatus 400 of FIG. 4, and/or the apparatuses 500/501 of FIG. 5A/5B, respectively). The header circuitry may enable one or more operations of a logic circuitry (e.g., such as the logic circuitry 102 of the aforementioned apparatuses). The selection signals may activate/deactivate the header circuitry and counterbalance circuitry in order to provide, among other operations, the masking of power consumption associated with one or more operations of the logic circuitry of a processor.

The method 802 also includes generating a first current corresponding to the power consumption (e.g., a first power consumption) associated with the one or more operations of the logic circuitry, at 892. For example, the header circuitry may receive a selb signal having logical value of 0 that corresponds to a "low" voltage value (e.g., a ground, VSS, or low voltage value) that may be part of activating the header circuitry (e.g., header circuitry 101 of the apparatuses 400 and/or 500/501 of FIGS. 4 and 5A/5B, respectively) to be substantially "on." Such activation of the header circuitry may enable the generation of a first current (e.g., the current 110) that corresponds to the operation of one or more functional blocks of a logic circuitry (e.g., the logic circuitry 102 of the apparatuses 400 and/or 500/501 of FIGS. 4 and 5A/5B, respectively).

The method 802 also includes generating a second current corresponding to a second power consumption that predictively counterbalances the power consumption associated with the one or more operations of the logic circuitry, where the second power consumption varies inversely with the power consumption associated with the one or more operations of the logic circuitry, at 894. For example, a counterbalance circuitry (e.g., the power-complementing circuitry 103 of the apparatuses 400 and/or 500/501 of FIGS. 4 and 5A/5B, respectively) may receive a selb signal having logical value of 0 that corresponds to a "low" voltage value (e.g., a ground, VSS, or low voltage value) that may be part of activating the power-complementing circuitry 103. Such activation of the power-complementing circuitry 103 to counterbalance the power consumed by the logic circuitry 102 may enable the generation of a second current (e.g., the current 114) that corresponds to a second power consumption. The generated second power consumption may be used to predictively counterbalance the power consumption associated with the operation of one or more functional blocks of the logic circuitry. The second power consumption generated by the method 802 may vary inversely with the power consumption associated with the one or more operations of the logic circuitry. It is to be understood that the power-complementing circuitry 103 of the method 802 may provide other inverse values of power consumption within a range of a maximum power consumption that is available.

The method 802 may incorporate the operations and characteristics described for the apparatuses 400 and/or 500/501 of FIGS. 4 and 5A/5B, respectively. For example, transistors (e.g., the second PMOS transistor 104 and the fourth PMOS transistor 106) of the power-complementing circuitry 103 may be sized based on different factors to enable generation of a second power consumption that may predictively counterbalance the power consumption associated with operations of a logic circuitry 102. In a non-limiting example, transistors of the power-complementing circuitry 103 may be sized based on power consumption estimates for one or more functional blocks of the logic circuitry 102. Alternatively or in addition, transistors may be configured to have different threshold voltage values. The method 802 may incorporate the various modes of operation of the apparatuses described herein such as, but not limited to, a secure mode, low-power mode, retention mode, or other modes of operation of a processor.

The method 802 may incorporate the timing and control characteristics described for the apparatuses 400 and/or 500/501 of FIGS. 4 and 5A/5B, respectively. For example, selection signals (e.g., selb, selb2 and/or selb3 signals) may be used as part of the method 900 to control the apparatus (e.g., apparatuses 400 and/or 500/501) so as to provide a power consumption for predictive power-complementing prior to or concurrently with performance of the operations/ instruction of the logic circuitry 102. Alternatively or in addition, the method 802 may incorporate control circuitry associated with the apparatus 400 and/or 500/501 to enable the adjustment of selection signal timing based on pipeline operations/instructions yet to be performed so as to affect the timing of providing the counterbalancing power consumption. Such control of the counterbalancing of the power consumption associated with the logic circuitry 102, may improve processor performance during the obfuscation of power consumption associated with encryption or non-encryption operations/instructions of logic circuitry.

Referring to FIG. 9, a block diagram schematically illustrating an apparatus for masking power consumption of a processor in accordance with yet another embodiment described herein is shown and generally designated 900. In accordance with FIG. 9, power/current measuring circuitry 910, which may correspond to the power/current measuring circuitry 119 of FIG. 1, may measure power consumed during actual operations of the logic circuitry 102. It should be noted that power/current measuring circuitry 910 may utilize VDD in order to determine power consumed by logic circuitry 102 (e.g., power=I×VDD). In addition power/ current measuring circuitry 910 may measure the first derivative of power, with respect to time, utilizing the first derivative of voltage (dV/dt) or current (di/dt) or a combination of both. These measurements give insight into the power variation within a cycle such that the power of the logic circuitry 102 may be complemented within a cycle and not just cycle-to-cycle. Power/current measuring circuitry 910 may perform such measurements on a clock-cycle-by-clock-cycle basis, so as to obtain an accurate time-dependent power consumption profile for operations performed by the logic circuitry 102. In response to measurement of actual power consumed by the logic circuitry 102, the power/ current measuring circuitry 910, which may form a portion of the processor 930, may store values of actual power consumption associated with logic operations into the memory storage device 950. Accordingly, when the processor 930 identifies operations to be performed by the logic circuitry 102, the processor 930 may direct the power-complementing circuitry 103 to consume a complement of the power to be consumed by the logic circuitry 102. Thus, as operations are performed by the logic circuitry 102, the power-complementing circuitry 103 may be configured to consume a complementary quantity of power to maintain a substantially constant power consumption by the combination of the logic circuitry 102 and the power-complementing circuitry 103. Power consumed by the power-complementing circuitry 103 may be measured via the power measurement circuitry 113 while the total power consumed by the logic circuitry 102 and the power complementing circuitry 103 (as well as the other components of FIG. 9) may be measured by the total current/power measurement circuitry 133.

It may be appreciated that the embodiment of FIG. 9 may represent a machine-learning scenario, in which the power/ current measuring circuitry 910 may cooperate with the processor 930 to populate the memory storage device 950 with values for power consumption of logic operations to be performed by the logic circuitry 102. Accordingly, in response to measurement of actual values of power consumption associated with logic operations, power consumption values stored in the memory storage device 950 may comprise a relatively high degree of accuracy.

In addition, as operating conditions of the logic circuitry 102 change, such as in response to operation over various ranges of temperature, (e.g., from about −40.0° C. to about +125° C.), the processor 930 may at least occasionally revise the memory storage device 950 with newly-measured values of power consumption associated with circuitry 102. Accordingly, computations of power to be consumed by the power-complementing circuitry 103 may be based on updated measurements of power consumed by the logic circuitry 102.

In another embodiment, computations of power to be consumed by the power-complementing circuitry may be based on measured values for power consumption of the logic circuitry 102. For example, when measured power consumption values associated with operations performed by the logic circuitry operating at a first temperature, such as a temperature of about 100.0° C., the processor 930 may extrapolate to arrive at an estimate of power consumption at a second temperature, such as a temperature of 50.0° C. It may be appreciated that although such extrapolations, or other types of estimations (e.g., interpolations, linear regressions, and so forth) may introduce some level of error into the power estimation process, such errors may represent acceptably small values. Additionally, it may also be appreciated that the processor 930 may utilize any number of estimating techniques, such as linear optimization techniques, which may be employed simultaneously so as to reduce errors of power estimations. Additionally, computation of power to be consumed by the power-complementing circuitry 103 may be based on a blending of two or more estimation techniques involving, for example, applying weighting functions to individual estimates in order to arrive at an estimated power consumed by the logic circuitry 102.

In a particular embodiment, the processor 930 may mask a power consumption by the logic circuitry 102 by modifying a pattern of binary digits communicated between the logic circuitry 102 and one or more external devices (not shown in FIG. 9). In one embodiment, a bit pattern may be modified by a multiplying a bit pattern by a generator matrix, such as a generator matrix utilized in producing a Hamming code. A four-bit data word comprising, for example, [0001], may be multiplied by an appropriate generator matrix (G) to form a codeword of [0001101]. Accordingly, an additional level of masking of power consumption associated with processing a data word (such as 0001) may be provided by utilizing a bit pattern computed by multiplying the codeword by a generator matrix. It may be appreciated that the processor 930 may update the memory storage device 950 utilizing the actual, measured power consumed in processing the codeword.

In another embodiment, the processor 930 may configure the power-complementing circuitry 103 to consume a complementary power based on a different operation than an operation currently performed, or scheduled to be performed, by the logic circuitry 102. Accordingly, in one embodiment, if the logic circuitry 102 is scheduled to perform a decryption process based on a RSA (Rivest, Shamir, Aldeman) cryptosystem, and in response to the processor 930 determining that power consumption values for such decryption are not available in the memory storage device 950, the processor 930 may substitute a power consumption profile for a different decryption process. Thus, in such an event, the processor 930 may configure the power-complementing circuitry 103 to consume power in response to the logic circuitry 102 performing a different decryption process, such as a process compliant with an AES (Advanced Encryption Standard). It may be appreciated that even during instances in which actual power consumptions by the logic circuitry 102 are unknown, such power consumptions may be estimated utilizing other, perhaps different operations. Accordingly, the power-complementing circuitry 103 may be configured to provide some level of masking of power to be consumed by the logic circuitry 102.

Figure 10:
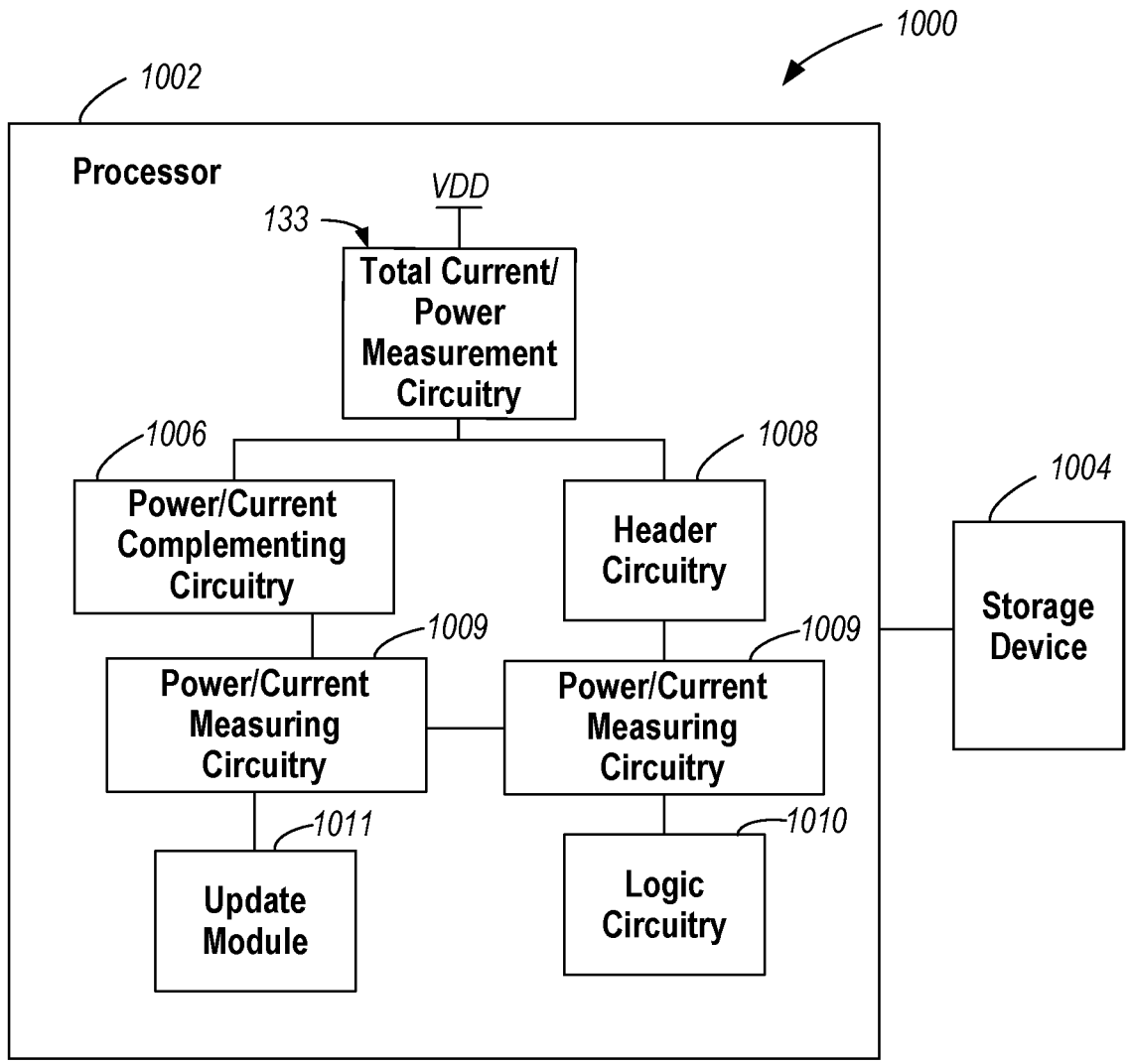
FIG. 10 is a block diagram schematically illustrating a system in accordance with the present techniques, apparatuses, and methods described herein.

Referring to FIG. 10, a block diagram schematically illustrating a system in accordance with apparatuses, methods, and techniques described herein is shown and generally designated 1000. The system 1000 may mask a power consumption associated with one or more operations of a logic circuitry. The system 1000 includes a processor 1002 that comprises a power/current-complementing circuitry 1006, a header circuitry 1008, and a logic circuitry 1010. The system 1000 may also include a storage device 1004. In a particular embodiment, the storage device 1004 may be included within the processor 1002. The power/current-complementing circuitry 1006 and the header circuitry 1008 may enable the masking of a power consumption associated with one or more operations of the logic circuitry 1010. A total current/power measurement circuitry 133 may measure the power consumed by substantially all of the elements of the processor 1002. The system 1000 may perform the method 800 of FIG. 8A as well as the operations, modes, or techniques associated with the apparatuses described herein.

The power/current-complementing circuitry 1006 may be configured to provide a second power consumption to directly complement the power consumption associated with the one or more logic operations performed by the logic circuitry 1010. For example, the system 1000 may utilize the apparatuses of FIGS. 1-3 and 6-7 and their respective power-complementing circuitry 103 to provide the second power consumption for complementing the power consumption associated with the logic circuitry 1010. The second power consumption may complement the power consumption associated with the one or more operations of the logic circuitry.

In another embodiment, the power/current-complementing circuitry 1006 may be configured to provide an estimated second power consumption to complement the power consumption associated with the one or more logic operations performed by the logic circuitry 1010. For example, the system 1000 may utilize the apparatuses of FIGS. 4 and 5A/5B and their respective power-complementing circuitry 103 to provide the second power consumption for predictively complementing the power consumption associated with the logic circuitry 1010. The second power consumption may complement the power consumption associated with the one or more operations of the logic circuitry.

The header circuitry 1008 may be configured to enable a common node to have a voltage that may vary in correspondence to one or more logic operations performed by the logic circuitry 1010 of the processor 1002. The header circuitry 1008 and the power/current-complementing circuitry 1006 may each be coupled to the logic circuitry 1010 at the common node. A first power/current measuring circuitry 1009 may operate to measure current conduction and/or power flow from header circuitry 1008 to logic circuitry 1010. For example, the system 1000 may utilize the apparatuses of FIGS. 1-3 and 6-7 and their respective header circuitry 101 to enable a common node voltage to vary in correspondence with the operations of the logic circuitry 1010. In the embodiment of FIG. 10, the update module 1011 may operate to obtain measurements from the second power/current measuring circuitry 1009 and update storage device 1004 with actual measured power and/or current. Accordingly, predictions of power and/or current consumed by the logic circuitry 1010 may be based on accurate and up-to-date measurements of power and/or current consumed by logic circuitry 1010. Similarly, the update module 1011 may convey updates to the power/current complementing circuitry 1006 to permit the circuitry 1006 to adjust power consumption based on actual and/or updated power/current consumption measurements of the logic circuitry 1010 as measured by the first power/current measuring circuitry 1009. In another embodiment, the header circuitry 1008 may be configured to enable the one or more operations of the logic circuitry 1010. The header circuitry 1008 and the power/current-complementing circuitry 1006 may be configured to receive a selection signal (e.g., selb). For example, the system 1000 may utilize the apparatuses of FIGS. 4 and 5A/5B and their respective header circuitry 101 to enable the one or more operations of the logic circuitry 1010.

In some embodiments, the first power/current measuring circuitry 1009 may be activated during one or more manufacturing processes utilized to fabricate the logic circuitry 1010. Such measurement of power consumption of the logic circuitry 1010 during manufacturing may allow actual values of power consumption associated with example operations of the logic circuitry 1010 to be loaded into, for example, nonvolatile memory locations. Such example operations could involve sample complex calculations, sample encryption/decryption processes, and/or numerous other processes executable by the logic circuitry 1010. Accordingly, upon initial activation of the logic circuitry 1010, highly accurate power consumption values associated with various operations of the logic circuitry 1010 may be stored in the storage device 1004.

The logic circuitry 1010 may have a power consumption resulting from one or more associated functional blocks or logic operations/instructions which may include, but are not limited to, any number of processor operations (e.g., data processing, arithmetic, and/or logical operations). Logic operations of the logic circuitry 1010 may correspond to one or more pipeline steps carried out by the processor 1002, one or more stages of a cryptographic algorithm, one or more "keyed" cryptographic steps, or cryptographic algorithms associated with one or more encryption standards (e.g., AES, DES, or RSA standards). The power consumption associated with the logic circuitry 1010 may be complemented by the power/current-complementing circuitry 1006 and the header circuitry 1008 to enable masking of a power consumption associated with one or more operations of the logic circuitry 1010.

The storage device 1004 may store and provide access to power consumption information (e.g., power consumption estimates) for one or more instructions associated with one or more operations that may be performed by the logic circuitry 1010. For example, the logic circuitry 1010 may access the storage device 1004 to retrieve the one or more instructions stored. Components (e.g., functional blocks) of the logic circuitry 1010 may execute the one or more instructions in order to perform the one or more operations associated with the logic circuitry 1010. The instructions stored and accessible from the storage device 1004 may include instructions related to any number of processor operations, such as, data processing, arithmetic, and/or logical operations, pipeline operations, cryptographic operations, or operations associated with one or more encryption standards (e.g., AES, DES, or RSA standards). The storage device 1004 may be in the form of volatile memory (e.g., SRAM, DRAM or other future volatile memory types) or non-volatile memory (e.g., ROM, EPROM, EEPROM, MRAM, or other future non-volatile memory types). The storage device 1004 may be separate from the processor 1002 or may be integrated with the processor 1002 (e.g., as cache memory of the processor or as registers associated with the operations of logic circuitry 1010).

The system 1000 may incorporate the operations and characteristics of the apparatuses described herein (e.g., apparatuses 100-700, and 900 of FIGS. 1-7 and 9, respectively). For example, the power/current-complementing circuitry 1006 may have transistors (e.g., the second PMOS transistor 104 and the fourth PMOS transistor 106) that are sized based on different factors to enable generation of a second power consumption to complement the power consumption associated with operations of a logic circuitry 1010. Transistors of the power/current-complementing circuitry 1006 may have different threshold voltage values or may be sized based on power consumption estimates for one or more functional blocks of the logic circuitry 1010. The system 1000 may incorporate the various modes of operation of the apparatuses described herein such as, a secure mode, low-power mode, retention mode, or other modes of operation of a processor. Furthermore, components of the system 1000 may be configured to enable control of timing and activation of the second power consumption for complementing (e.g., power consumption masking) of the power consumption associated with the logic circuitry 1010.

The system 1000 may operate to provide a second power consumption that would act to obscure the total power consumption of the logic circuitry 1010 that is associated with the processor 1002. The masking of power consumption provided by the system 1000 may obstruct or thwart the undesired monitoring/analysis (e.g., a DPA attack) of the processor 1002, its associated operations/instructions and corresponding power consumption. Such masking of the power consumption associated with logic circuitry 1010 may provide improvements in the security and integrity of data, instructions, and/or operations (e.g., cryptographic and/or other operations) that are processed by components of the processor 1002.

Figure 11:
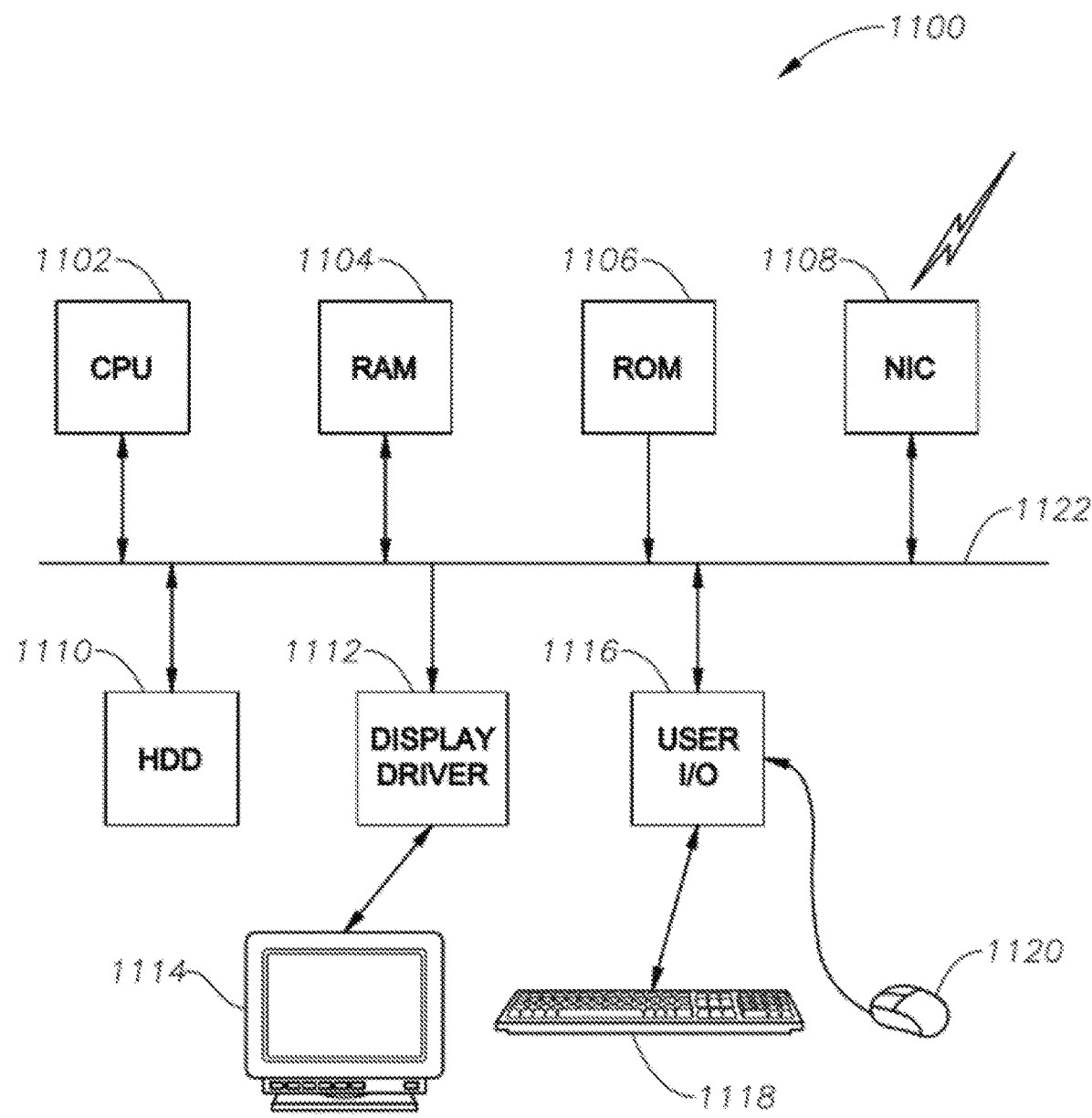
FIG. 11 illustrates a block diagram of a computer system in accordance with implementations of the present techniques, apparatuses, systems, and methods described herein.

Referring to FIG. 11, a block diagram schematically illustrating a general purpose computer of the type that may be used to implement the above described apparatuses, methods and techniques is shown and generally designated 1100. The general purpose computer 1100 includes a central processing unit 1102, a random access memory 1104, a read-only memory 1106, a network interface card 1108, a hard disk drive 1110, a display driver 1112, a user input/output circuit 1116 with a keyboard 1118 and mouse 1120, and a monitor 1114 all connected via a common bus 1122. In operation the central processing unit 1102 will execute computer program instructions that may be stored in one or more of the random access memory 1104, the read-only memory 1106 and the hard disk drive 1110, or dynamically downloaded via the network interface card 1108. The results of the processing performed may be displayed to a user via the display driver 1112 and the monitor 1114. User inputs for controlling the operation of the general purpose computer 1100 may be received via the user input/output circuit 1116 from the keyboard 1118 or the mouse 1120. It will be appreciated that the computer program could be written in a variety of different computer languages. The computer program may be stored and distributed on a recording medium or dynamically downloaded to the general purpose computer 1100.

When operating under control of an appropriate computer program, the general purpose computer 1100 can include the above described apparatuses (e.g., the apparatuses 100-700 of FIGS. 1-7, respectively) and perform the above described methods and techniques (e.g., the methods 800, 801, 802, and/or 900 of FIGS. 8A, 8B, 8C, and 9, respectively) and can be considered to form a particular apparatus for performing the above described methods and techniques. For example, the particular apparatus may include the system 1000 of FIG. 10 or one or more components of the system 1000 of FIG. 10. The architecture of the general purpose computer 1100 could vary considerably, and FIG. 11 is only one example Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

What is claimed is:

1. An apparatus for masking a first power consumption associated with one or more operations performed by logic circuitry of the apparatus, comprising:
   mimic circuitry to determine a time versus power signature of the one or more operations performed by the logic circuitry; and
   second circuitry configured to generate a second power consumption based on the determination by the mimic circuitry,
   wherein the second power consumption complements the first power consumption to form a substantially constant power consumption.

2. The apparatus of claim 1, wherein the second power consumption and the first power consumption combine to form the substantially constant power consumption on a clock-cycle-by-clock-cycle basis.

3. The apparatus of claim 1, wherein the second power consumption is generated in response to access of power consumption parameters for logic operations stored via a storage device.

4. The apparatus of claim 3, wherein the logic operations include one or more pipeline operations.

5. The apparatus of claim 4, wherein the one or more pipeline operations relate to at least one cryptographic security operation.

6. A circuit, comprising:
logic circuitry, wherein the logic circuitry consumes a first power;
a predictive element to estimate the first power consumed by the logic circuitry, wherein the estimation of the predictive element is based on the first power consumed by the logic circuitry in a next clock cycle; and
second circuitry, wherein the second circuitry consumes a second power based at least on the estimation of the predictive element,
wherein the second power consumption complements the first power such that the sum of the first power and the second power combine to form a substantially constant power consumption.

7. The circuit of claim 6, further comprising: a storage device to store power consumption parameters of the first power based on operations performed by the logic circuitry.

8. The circuit of claim 7, wherein the second power consumption is predictively generated based on the stored power consumption parameters.

9. The circuit of claim 7, wherein the stored power consumption parameters are stored on a clock-cycle-by-clock-cycle basis.

10. The apparatus of claim 1, wherein the mimic circuitry comprises of a plurality of sub-complementing circuits connected in parallel between a first reference voltage supply and a second reference voltage supply.

11. The apparatus of claim 10, wherein a selective activation of the plurality of sub-complementing circuits determines the second power consumption of the second circuitry.

12. The apparatus of claim 1, wherein the determination of time versus power signature includes determining timing of power magnitude peaks occurring within each clock cycle.

13. A circuit, comprising:
logic circuitry, wherein the logic circuitry consumes a first power;
a predictive element to estimate the first power consumed by the logic circuitry, wherein the predictive element estimates a time versus power signature of operations performed by the logic circuitry; and
second circuitry, wherein the second circuitry consumes a second power based at least on the estimation of the predictive element,
wherein the second power consumption complements the first power such that the sum of the first power and the second power combine to form a substantially constant power consumption.

14. The circuit of claim 7, wherein the second power consumed by the second circuitry is further based on a reactive power relationship between the logic circuitry and the second circuitry.

15. The circuit of claim 7, wherein the estimation of the predictive element is based on a power consumption required for an operation of the next clock cycle of a pipeline process.

* * * * *